United States Patent [19]

Holtey et al.

[11] Patent Number: 4,945,473
[45] Date of Patent: Jul. 31, 1990

[54] COMMUNICATIONS CONTROLLER INTERFACE

[75] Inventors: Thomas O. Holtey, Newton, Mass.; Thomas L. Murray, Jr., Hollis; Scott W. Smith, Hudson, both of N.H.; Wayne A. Perzan, Holbrook, Mass.

[73] Assignee: Bull HN Information Systems Inc., Billerica, Mass.

[21] Appl. No.: 51,084

[22] Filed: May 15, 1987

[51] Int. Cl.[5] ................ G06F 13/00; G06F 15/16
[52] U.S. Cl. .................... 364/200; 364/232.2; 364/238.2; 364/239; 364/247.8
[58] Field of Search .............. 364/200 MS, 900 MS

[56] References Cited

U.S. PATENT DOCUMENTS

| | | | |
|---|---|---|---|
| 3,651,482 | 3/1972 | Benson et al. | 340/172.5 |
| 4,433,378 | 2/1984 | Leger | 364/200 |
| 4,482,982 | 11/1984 | Yu | 364/900 |
| 4,488,231 | 12/1984 | Yu | 364/200 |
| 4,546,429 | 10/1985 | Chan et al. | 364/200 |
| 4,628,446 | 12/1986 | Hoffner, II. | 364/200 |
| 4,724,520 | 2/1988 | Athanas et al. | 364/200 |

Primary Examiner—Eddie P. Chan
Assistant Examiner—Christina M. Eakman
Attorney, Agent, or Firm—Faith F. Driscoll; John S. Solakian

[57] ABSTRACT

A communications controller interface for emulating the previous system employing a plurality of line units in which data is transmitted and received. The interface includes a microprocessor-controlled interface control unit having an interface memory having a plurality of addressable storage locations. The interface memory is mapped by dividing it into a number of groups of locations corresponding to the number of communication lines with each group of locations being subdivided into further locations including a location for storage of receive data, a location for storage of transmit data, and a control location. There are a number of control elements each for generating a sequence of signals for different tasks to be performed by the interface control unit. These control elements are interconnected to the interface control unit and to the interface memory so that the multi-line communications unit is able to access different ones of the control locations for updating the status of the lines and further enabling the microprocessor-controlled interface control unit to transfer data to and from the transmit data and receive data locations of the lines in the predetermined sequence consistent with the status.

20 Claims, 10 Drawing Sheets

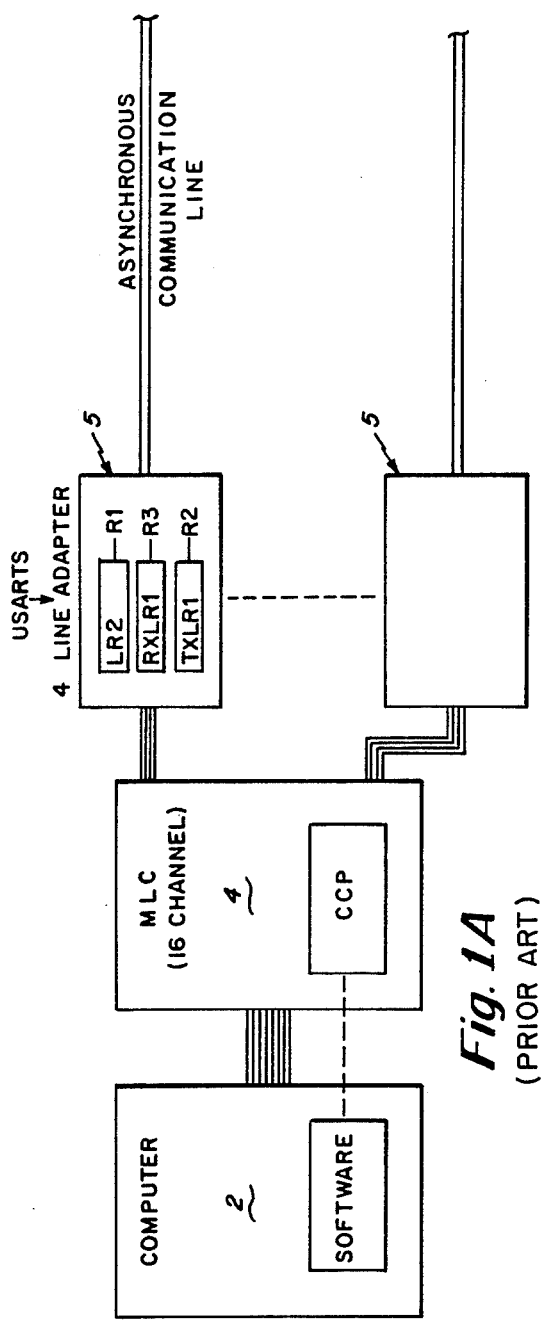
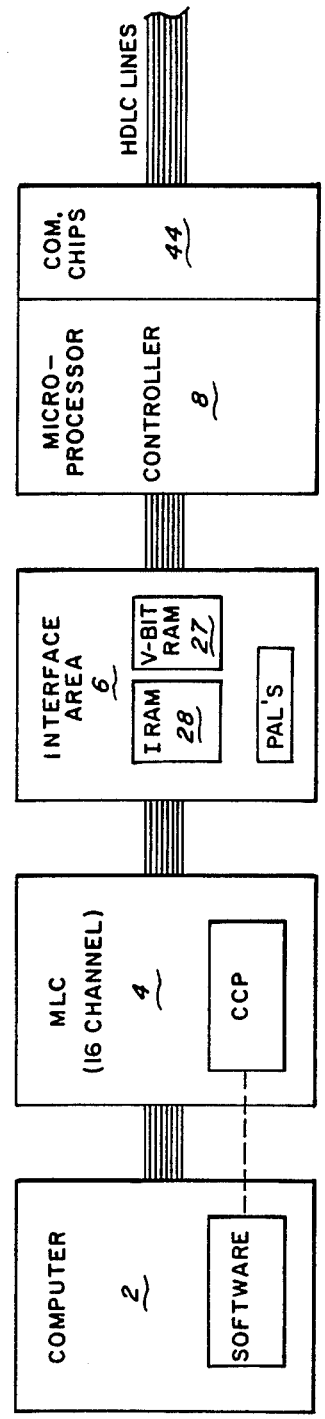
Fig. 1A (PRIOR ART)
Fig. 1B

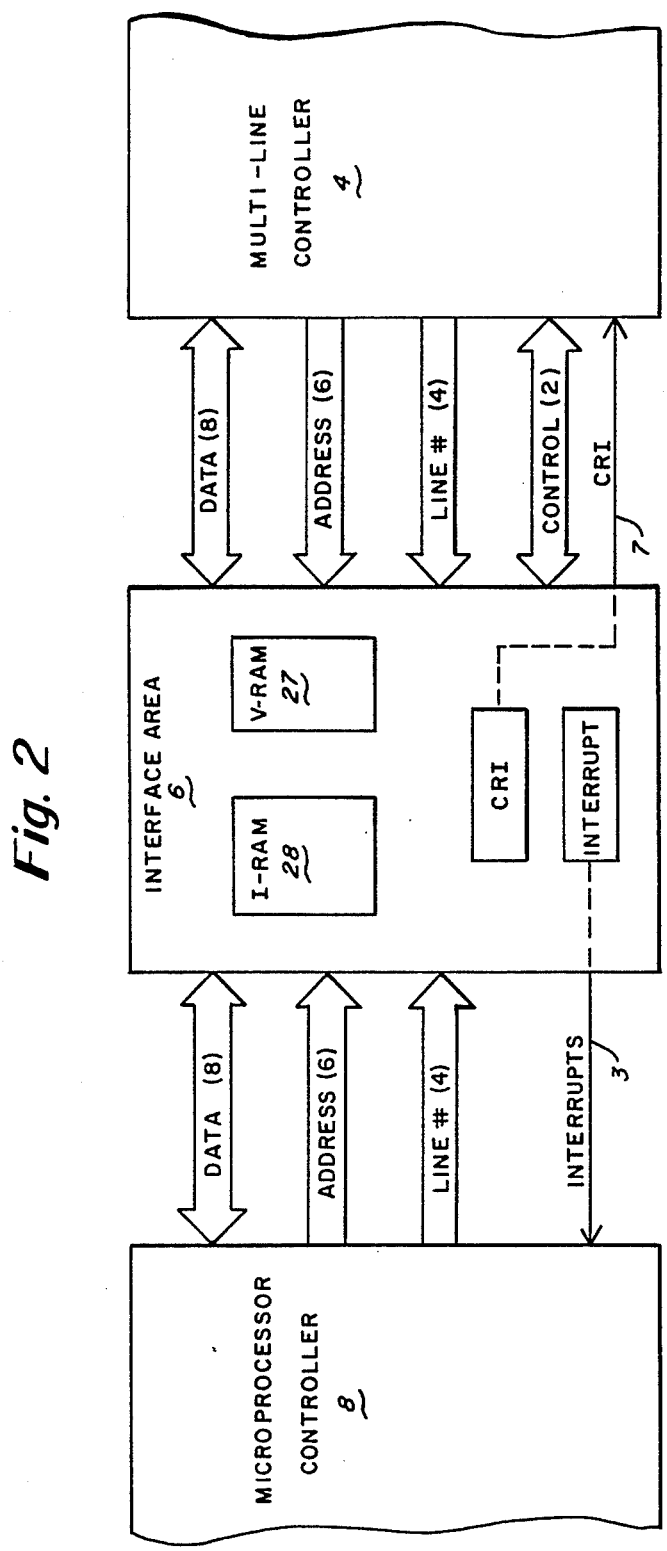

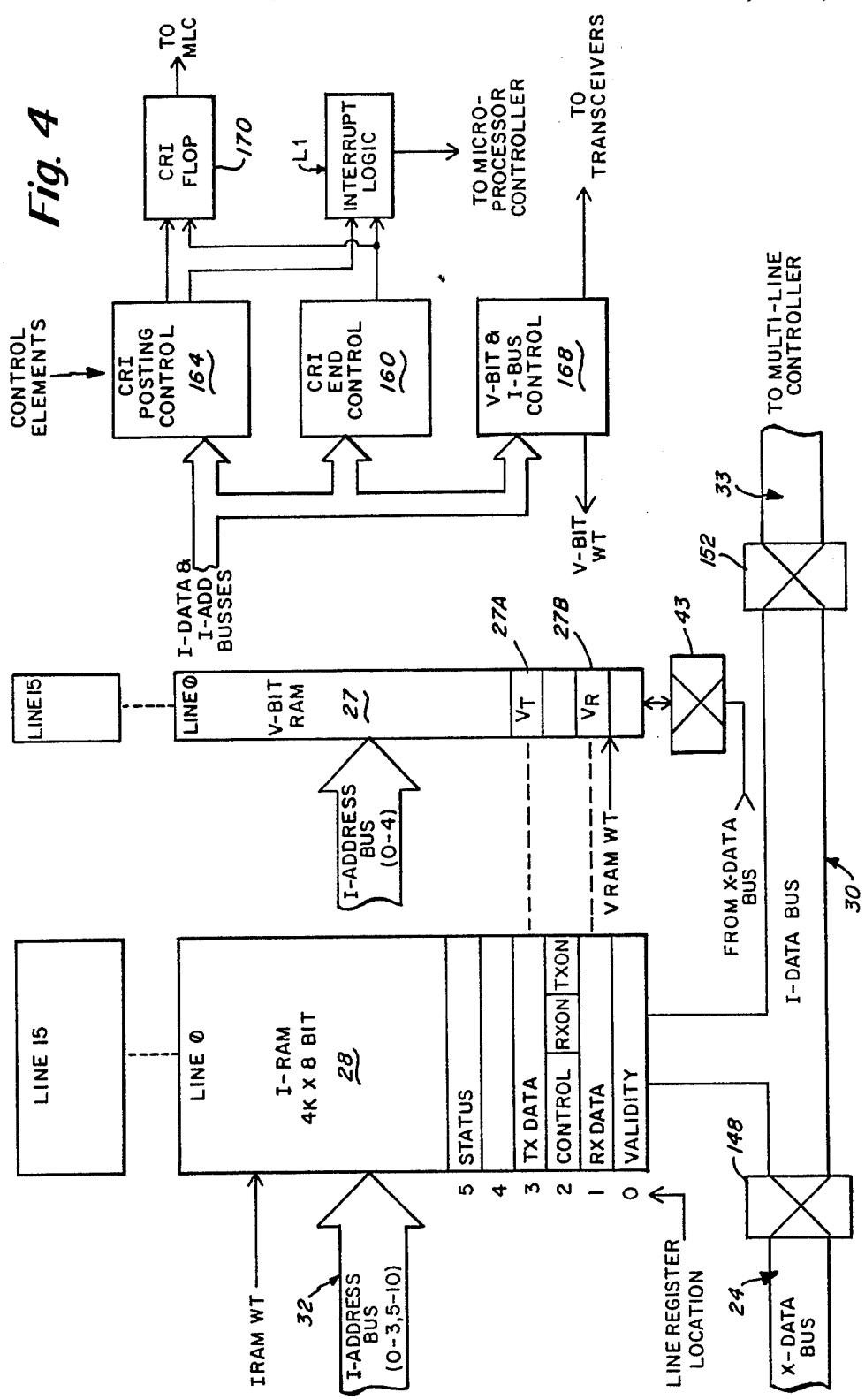

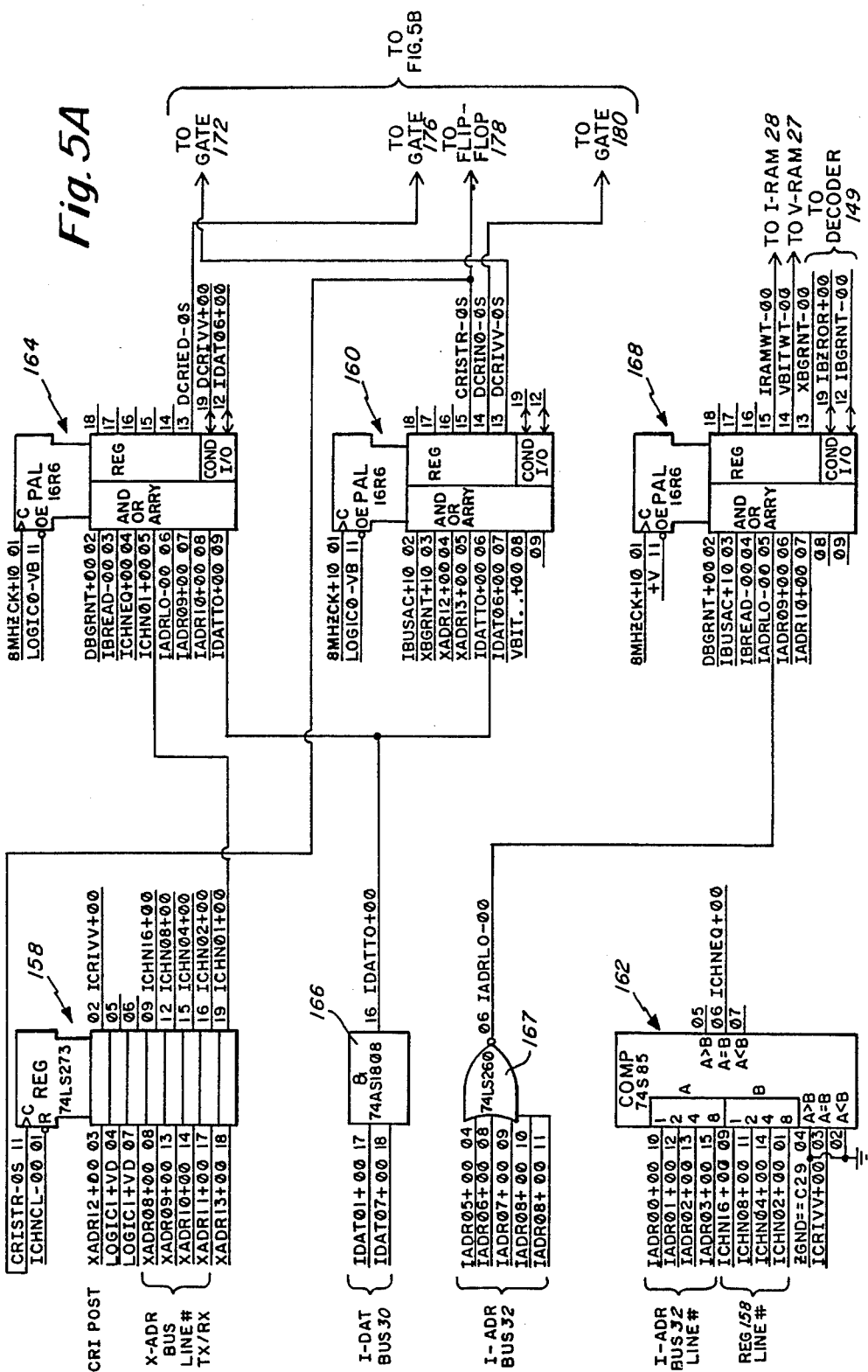

COMMUNICATIONS CONTROLLER INTERFACE

RELATED APPLICATIONS

The following previously filed U.S. patent applications assigned to the same assignee as the instant application, are related to the instant application.

"DUAL MICROPROCESSOR CONTROL SYSTEM" by Thomas Holtey et al, U.S. Ser. No. 032,902, filed Mar. 31, 1987.

"A FIRMWARE STATE MACHINE" by Thomas Holtey et al. U.S. Ser. No. 032,896, filed Mar. 31, 1987.

BACKGROUND OF THE INVENTION

1. Field of the Invention

The present invention relates in general to a data communications system and pertains, more particularly, to a data communications system that provides for the transfer of data information, control information and signaling information between a telephone system and a computer system. Even more particularly, the present invention relates to a communication control interface apparatus used in such data communication system.

2. Background Discussion

A data communication system of the type described herein may typically include a central processing unit and associated main memory adapted to communicate via a system bus with a communication controller that forms part of a communication subsystem that is adapted to service a number of communication lines. The communication subsystem may typically include a line microprocessor for communicating with the communication lines and a shared memory, and an I/O microprocessor for communicating with the shared memory and the central processing unit and main memory. A system of this type is described in U.S. Pat. No. 4,482,982 and U.S. Pat. No. 4,488,231, both owned by the instant assignee herein.

Reference is also now made herein to U.S. Pat. No. 4,407,014 that describes a communications sub-system employing USART (universal synchronous/asynchronous receiver transmitter) devices for communication between a communications controller and multiple communication lines.

In the above-identified systems, the multi-line controller typically interfaces via USART's with an asynchronous communication line. However, for other forms of data communication, such as with high speed data link control (HDLC) communication, there is a need to then provide a substitute interface area. This interface area is to provide compatible operation between the communication line and the multi-line controller.

OBJECTS OF THE INVENTION

Accordingly, it is an object of the present invention to provide an improved communications controller interface apparatus between a multi-line controller and a high speed data communication line.

Another object of the present invention is to provide a communications controller interface apparatus that is software compatible with an existing multi-line controller.

Still another object of the present invention is to provide a communications controller interface apparatus that is capable of handling heavy data transfer.

A further object of the present invention is to provide a communications controller interface apparatus that is furthermore of simplified construction not requiring complex logic circuitry and thus associated board space.

SUMMARY OF THE INVENTION

To accomplish the foregoing and other objects, features and advantages of the invention, there is provided an apparatus and associated method for emulating an interface between a microprocessor control unit and a multi-line communications unit. These units transmit and receive data therebetween. In accordance with the invention, one is emulating a previous system employing a plurality of line units in which data is transmitted and received thereat according to a predetermined protocol with the line units constructed from a number of descrete registers and combinatorial logic circuits.

The apparatus and method of the present invention is accomplished in a preferred embodiment by means of a microprocessor-controlled interface control unit including an interface memory that is preferably a random access memory and that has a plurality of addressable storage locations. The interface memory is mapped by dividing it into a number of groups of locations corresponding to the number of communication lines with each group of locations being subdivided into further locations including a location for storage of receive data, a location for storage of transmit data, and a location for storage of a control word, referred to herein as the line register two (LR2) control location.

The embodiment of the present invention is further comprised of a number of control elements each for generating a sequence of signals for different tasks to be performed by the interface control unit. These control elements may be implemented by logic circuits and in the particular embodiment disclosed herein are implemented by programmable array logic (PAL). These control elements include at least three separate control elements. There is a control element for character request interrupt (CRI) posting. There is a control element for bus control. Furthermore, there is a control element for control between the interface memory and the multi-line communications unit.

The embodiment of the present invention further includes means for interconnecting these control elements to the interface control unit and to the interface memory so that the multi-line communications unit is able to access different ones of the control locations for updating the status of the lines and further enabling the microprocessor-controlled interface control unit to transfer data to and from the transmit data and receive data locations of the lines in the predetermined sequence consistent with said status.

In accordance with a further feature of the preferred embodiment a validity bit memory is associated with the interface memory. The validity bit memory, preferably implemented by a random access memory, has a plurality of locations. At least a pair of locations are assigned to each line. The contents of the locations are usually controlled from a channel control program (CCP) of the multi-line communications unit to specify how the multi-line communications unit had responded in servicing the interrupt received from a line. For example, the transmit and receive validity bits may be set to a "1" for indicating that the multi-line communications unit transmitted data to the interface control unit or received data from the interface control unit since the posting of a CRT.

BRIEF DESCRIPTION OF THE DRAWINGS

Numerous other objects features and advantages of the invention should now become apparent upon a reading of the following detailed description taken in conjunction with the accompanying drawings, in which:

FIG. 1A is a block diagram of a data communication system operating with an asynchronous communication line and furthermore employing USART adaptor devices for communication between a multi-line controller and the communication lines;

FIG. 1B is a general block diagram illustrating the data communication system of the present invention operated with a high speed communication line and incorporating the interface control unit of the present invention;

FIG. 2 is a next level block diagram in accordance with the present invention illustrating the interface area as coupled between the microprocessor controller and multi-line controller;

FIG. 4 is a more detailed block diagram of the interface memory also illustrating the V-BIT memory and associated controls;

FIGS. 5A and 5B are detailed logic diagrams of a portion of the interface of the invention illustrating, interalia, the programmable array logic for control functions, and the CRI posting register;

DESCRIPTION OF PREFERRED EMBODIMENT

Reference is also now made to the block diagram of FIG. 1A showing a data communication system that is comprised of computer 2 intercoupling with a multi-line controller 4. Computer 2, contains operating software and similarly the multi-line controller (MLC) 4 has resident therein a channel control program (CCP) for processing the data stream of several communication channels.

The communications system of FIG. 1A employs the USART devices in the form of line adapters 5 for providing data communication between the MLC 4 and sixteen asynchronous communication lines. As illustrated in FIG. 1A, for servicing the sixteen lines there may be four separate line adapter boards, each containing four USART's with each USART device including a number of registers.

The USART device includes a number of registers that are adapted to be used on the data bus. For example, there is a register into which data is written. There is also another register from which data received is read. There are registers for certain control operations. For instance, by writing into a specific address in the USART device, one can set a baud rate that will set the data rate to be used on the line. There is also a control register in which the transmission function and the receive function is controlled to be turned "on" and "off".

Figure 1C:
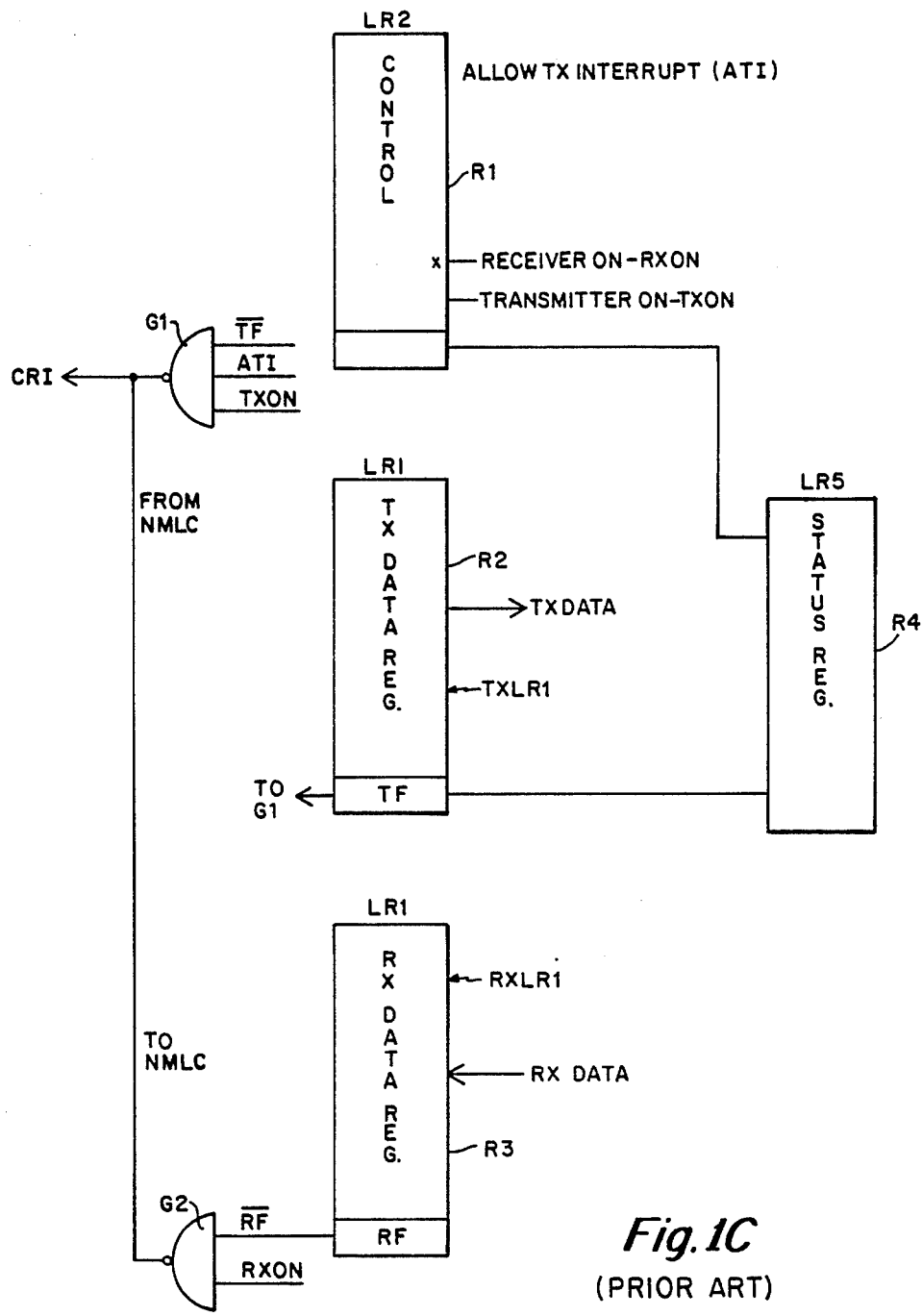
FIG. 1C is a block diagram for one of the communication lines illustrating the USART registers and associated logic.

In FIG. 1A the USART devices may be used to interface with standard communication interfaces such as an RS232 or RS422 interface. The USART devices may be of type 2661. Reference is also now made to the more detailed block diagram of FIG. 1C for an illustration of the control register R1 as well as the transmit and receive registers R2 and R3 respectively. Also illustrated in FIG. 1C is the status register R4. FIG. 1C illustrates the previous circuitry for generating interrupts and in particular character request interrupts (CRI). This involves the use of the gates G1 and G2. A transmit or receive register full signal is coupled to each of these gates as well as certain control signals indicating whether the transmitter "on" or the receiver "on" function is present. When the appropriate register is full and either a transmit or receive control bit is set then a CRI is posted. The block diagram of FIG. 1C is repeated for each of the sixteen lines and thus there are sixteen separate CRI's that are generated. The multi-line controller 4 is to keep track of the sixteen lines to determine what interrupts are outstanding and can then apply its algorithm for determining which lines are to be processed.

A further requirement is now imposed in that the communication line that is employed in the system is, in place of an asynchronous communication line, employing high speed data link control (HDLC) communication. This is a high speed form of communication line data transfer in which communication bytes are packetized, sent and received over the telephone line at a speed of 64K bits per second for each channel with each channel being fully duplex. For reasons of overhead efficiency, data integrity and bandwidth utilization, it is desired to send more than one byte per packet. Each packet or block of data has a header byte to distinguish between data and modem status up-date messages. The header byte is typically followed by a plurality of data bytes and two check bytes. Now, to handle the packetizing and depacketizing of the data along with modem status updating, a microprocessor controller is employed as described and covered in the above-identified related applications.

Now, the task of the present invention is to now provide an interface apparatus between the microprocessor controller and the multi-line controller so as to emulate the operation previously obtained with the USART devices operating on an asynchronous communication line system. The task is to provide a software compatible interface apparatus that couples between an existing multi-line controller for which programs already exist and the aforementioned microprocessor controller. This emulation is to be carried out so that the communication from the multi-line controller standpoint appears as sixteen asynchronous lines but when in actuality communication is with a different high speed communication line of HDLC type. This interface apparatus is to provide proper communication while preventing the necessity of writing new software thus allowing the use of existing software applications in the computer 2 and multi-line controller 4.

Reference is now made to FIG. 1B which is a general block diagram illustrating the overall system of the present invention. At one end is the computer 2 intercoupling with the multi-line controller 4. At the other end is the telephone PBX system. Communication thereto is by way of the communication chips 44 that interface with the HDLC lines depicted in FIG. 1B. FIG. 1B also illustrates the multiprocessor controller 8. Both the controller 8 as well as the communication circuits 44 are described in more complete detail in FIG. 3 to be described hereinafter.

The principals of the present invention are directed primarily to the interface area 6 for providing data communication between the microprocessor controller 8 and the multi-line controller 4. In essence, and with respect to FIG. 1A, the microprocessor controller 8 and the interface area 6 essentially replace the line adapters 5 of FIG. 1A.

The multi-line controller 4 illustrated in FIG. 1B may generally be of the type described in the aforementioned U.S. Pat. Nos. 4,482,982 and 4,488,231 and identified herein as a communication controller. The computer 2 may be a Honeywell DPS6 computer system.

Reference has been made hereinbefore, to the use of microprocessors, contained within the microprocessor controller 8, for providing the packetizing and depacketizing of the data along with the modem status updating, etc. In addition, in place of the multiple registers that are required with the use of the USART devices, the interface area 6, as noted in FIG. 1B now employs an interface RAM identified herein as the I-RAM 28. However, the use of a random access memory for data storage has required some additional logic to control proper data communication. The task basically is to make the memory into an interactive device. In this regard it is noted that at least two different register locations are involved in the decision making while only one memory location can be accessed at a time. Also, any indications of the ending of a CRI are time critical. In this regard a delay of say 30-50 microseconds in setting a CRI may not be critical, but the resetting of that CRI is time critical.

The I-RAM 28 can implement most of the functions of the multi-line controller communicating therewith. For example, the random access memory can use storage locations as status registers and control registers except in those cases where the control has to be in real time. In this regard, the only real time aspects of events occurring on the multi-line controller bus have to do with character request interrupts (CRI's). These are requests for characters to be transmitted, or requests that characters that have been received be unloaded before they are destroyed by incoming data. These requests must be generated as close in timing to that carried out previously in connection with the system described in FIGS. 1A and 1C. This timing must be carried out even though, through packetization, the data may come in or go out at a much higher speed (125 microseconds per character).

Character request interrupts can be handled by software in basically two manners.
1. The character can be supplied or taken.
2. The transmit or receive function can be turned "off".

Furthermore, transmit CRI's can have a further complication. The data can be supplied before the transmit function is enabled and the character is to be sent out first before a CRI is generated, or the transmit function can be enabled with no data delivered, and the unit will issue a CRI causing data to be delivered. It is this complication of the basic dual port RAM that requires further implementation to be described hereinafter.

Now, because the MLC is capable of writing into the control location or transmit data location of the memory on any bus cycle, either immediately before or immediately after the microprocessors read the data, a race condition can exist which condition would not exist were the interface to be implemented as in the past with discrete registers and gates. No microprocessor program can close this race window down to a reasonable level, that window being defined as a single MLC bus cycle. Again, to accomplish this it would require at least two registers per line. This is clearly too much hardware to fit the physical size requirements in accordance with the design considerations of the present system.

Thus, in summary, additional circuitry is required to enable the interface memory to operate as an interactive device. This is handled basically by the addition of a second memory, referred to herein as the V-BIT memory 27. The V-BIT RAM 27 is essentially an indicator of fullness or emptiness of the corresponding transmit and receive locations of the I-RAM 28. The I-RAM and VRAM 27 may be simultaneously addressed but are written into separately. Reference is made hereinafter to further details of the operation regarding the VRAM 27 and the setting and resetting of the control bits therein.

Reference is now made to the block diagram of FIG. 2 illustrating the microprocessor controller 8, multi-line controller 4 and interface area 6. FIG. 2 also illustrates data lines intercoupling these components. Each of these data busses are of 8 bits. Also illustrated are address bits intercoupling the units. Six bits are used for addressing. There are also disclosed in FIG. 2 line number addresses. These are four bits and couple respectively from the microprocessor controller and multi-line controller to the interface area 6.

FIG. 2 also illustrates an interrupt line 3 that couples from the interface area 6 to the microprocessor controller 8. FIG. 2 also illustrates the CRI interrupt line 7 that is considered as coupling from the interface area 6 to the multi-line controller 4. Finally, there is illustrated a two bit bus for control between the multi-line controller 4 and the interface area 6.

Figure 3:
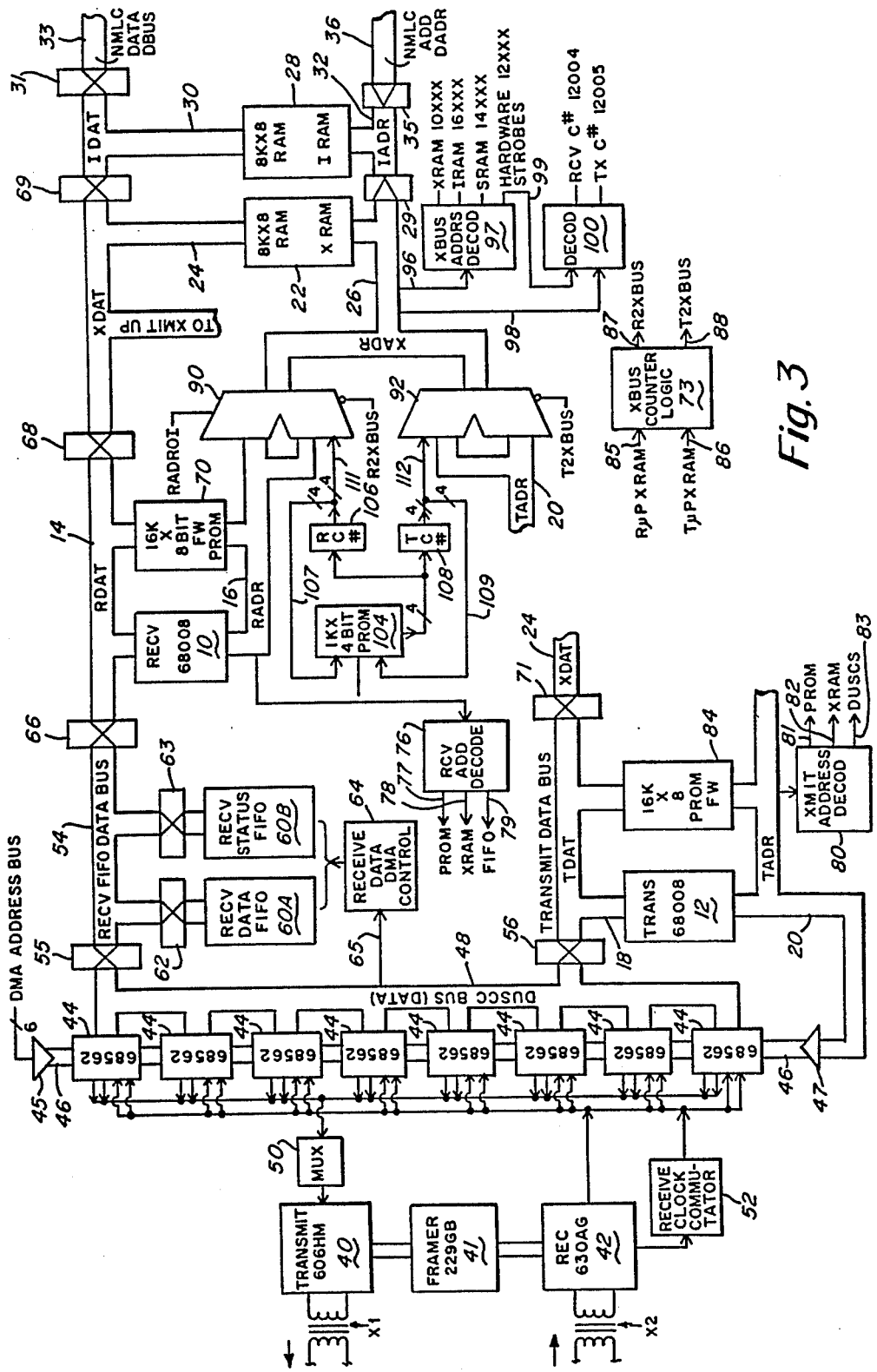
FIG. 3 is a block diagram illustrating the microprocessor controller as well as the interface memory.

Reference is now made to the detailed block diagram of FIG. 3. FIG. 3 illustrates a digital asynchronous multiplex adapter system that provides for the transfer of data, control information and signalling information as required to support operations between a number of terminal devices coupled by a telephone line to the left in the diagram, and a computer system such as illustrated in FIG. 1B and associated multi-line controller also illustrated in FIG. 1B that would be coupled from the right of the diagram of FIG. 3. More particularly, the terminal devices may be connected via AT&T terminal adapters, an AT&T system 85 PBX and the PBX Digital Multiplex Interface trunk, and applications running in a computer system such as a Honeywell DPS-6 supported via the asynchronous multiplex adapter system and a multi-line communication controller. For the sake of simplicity herein, the terminal devices, and multi-line communication controller, are not described in detail herein.

The microprocessors are illustrated in FIG. 3 as a receive microprocessor 10 and a transmit microprocessor 12. Both of these microprocessors may be of conventional type 68008. Associated with the receive microprocessor 10 is the receive data bus 14 and also the receive address bus 16. Associated with the transmit microprocessor 12 is the transmit data bus 18 and the transmit address bus 20.

FIG. 3 also illustrates the X-RAM 22 having associated data bus 24 and address bus 26. In the block diagram of FIG. 3, the I-RAM 28 is disposed adjacent to the X-RAM 22. The I-RAM 28 similarly has associated therewith a data bus 30 and an address bus 32. The databus 30 couples by way of transceiver 31 to the output data bus 33 which is adapted to couple to a multi-line communication controller, not illustrated in FIG. 3. Similarly, the address bus 32 is adapted to couple by way of transceiver 35 to the address bus 36. The address bus 36 is adapted to likewise couple to a multi-line communication controller, not illustrated herein.

Herein reference is made to the use of transceivers used in association with address and data busses, such as the aforementioned transceiver 35. However, in some instances these devices may be substituted for by tri-state buffers.

As indicated previously, the system illustrated in the block diagram of FIG. 3 is adapted to connect to up to 16 terminal devices at any one time via a digital multiplex interface trunk. In this connection to the left in the block diagram of FIG. 3 note the coupling transformer X1 for the transmission of signals from the transmitter 40. Also note the coupling transformer X2 for the receipt of signals by the receiver 42. Coupled between the transmitter and receiver is a framer 41. The transmitter 40, receiver 42 and framer 41 are all standard AT&T circuits. The transmitter is of type 606 HM. The framer circuit is of type 229BG. The receiver is of type 630AG.

The block diagram of FIG. 3 also shows communication between both the transmitter 40 and the receiver 42 to the data circuits 44. The circuits 44 are commonly referred to as DUSCC chips. Each of these is a dual universal serial communication controller (DUSCC). These circuit chips are conventional and are identified by Signetics part number 68562. As illustrated in FIG. 3 there are eight of these data circuits 44. Each circuit 44 comprises two communication channel processors. Also note in FIG. 3 the address bus 46. With each of the data circuits 44 being comprised of two communication channels, there are a total of 16 lines that couple to the DUSCC data bus 48.

With regard to communication at the data circuits 44, it is also noted in FIG. 3 that there is provided a multiplexer 50 that provides communication, as to be described in further detail hereinafter, between the data circuits 44 and the transmitter 40. Also illustrated in the block diagram of FIG. 3 is a receive clock commutator 52 that controls the transfer of data from the data circuits 44 to the receiver 42. This operation is also described in further detail hereinafter.

Basically, the outputs from the data circuits 44 are multiplexed by the multiplexer 50 and are coupled to the transmitter 40 in a time division multiplexed manner. The receiver inputs of each of the data circuits 44 are connected in common as illustrated in the diagram and there is provided a clocking scheme (see commutator 52) that delivers 8 clock pulses to each of the data circuits 44 in sequence. The clock signals from the receiver 42 are de-multiplexed and decoded and delivered to each of the 16 channels of the data circuits 44 on a time division multiplex basis.

As indicated previously, the data circuits 44 have a common address bus 46. This address bus is comprised of 6 address lines which may be driven semi-directly from the transmit microprocessor 12. Note in FIG. 3 that the transmit address bus 20 couples by way of buffer 47 to the data circuits address bus 46.

As indicated previously, the transmit microprocessor 12 is of type 68008. The transmit microprocessor 12 at its address bus provides for substantially direct addressing of the data circuits 44. Also note that the address bus 46 for the data circuits 44 may be controlled from direct memory access (DMA) control logic. In this regard note the coupling at buffer 45 in FIG. 3. This particular DMA address control is used to access the data circuits 44 for receiving data. The transmit microprocessor 12 on the other hand accesses the same bus 46 directly for transmitting data and also for set-up.

The data circuits 44 all have a common data bus 48 which is referred to as the DUSCC data bus. It is noted that this data bus 48 is separated from the receive fifo data bus 54 by a transceiver 55. Similarly, the data circuits 44 data bus 48 is separated from the transmit data bus 18 by a further transceiver 56. With regard to access to the address bus 46, conventional control logic is provided to assure that the transmit microprocessor 12 is not on the bus 46 at the same time that the DMA controller is.

As indicated previously, the DUSCC data bus 48 couples by way of transceiver 55 to the receive fifo data bus 54. Coupled from the bus 54 is a large capacity fifo illustrated in the block diagram of FIG. 3 in two parts including a receive data fifo 60A and a receive status fifo 60B. Hereinafter this will be referred to from time to time as fifo 60. The receive data fifo 60A couples to the fifo data bus 54 by way of the transceiver 62. Similarly, the receive status fifo 60B couples to the fifo data bus 54 by way of the transceiver 63. Also illustrated in FIG. 3 is the receive data DMA controller 64 which provides control to the fifo 60. Also note in FIG. 3 the line 65 coupling from the DUSCC data bus 48 to the controller 64.

In two bus cycles data is read out of the data circuits 44 via the transceivers 55, 62 and 63, including both status and data, storing this information in the fifo under control of the receive data DMA controller 64. This data and status information is stored in the fifo 60 and is accessed by the receive microprocessor 10. In this regard, note that the data bus 14 associated with the receive microprocessor 10 is coupled to the fifo data bus 54 by way of the transceiver 66. The receive microprocessor 10 accesses the fifo 60 whenever it has a chance and it does so by way of a polling scheme. More particularly, the receive microprocessor 10 interrogates the fifo 60 and checks the status indication therein to find out if anything is stored in the data section of the fifo 60. If it is, it reads the status and data information into the X-RAM 22 where it is stored. It actually stores the data in the X-RAM 22, checks the status and takes appropriate action if necessary. In this connection note that the communication from the receive microprocessor 10 is by way of the receive data bus 14 and the transceiver 68 to the X-data bus 24. There is also a further transceiver 69 that intercouples the X-data bus 24 with the I-data bus 30.

The receive data bus 14 has coupled thereto, in addition to the receive microprocessor 10, the firmware prom 70. This prom 70 is preferably a 16K by 8 bit prom or eprom.

As indicated previously, the X-data bus 24 is coupled to the R-data bus 14 by transceiver 68. Similarly, there is also a further transceiver 71 that intercouples the X-data bus 24 to the transmit data bus 18. Control logic circuitry assures that the receive microprocessor 10 and transmit microprocessor 12 are never both on the X-data bus 24 at the same time.

As indicated previously, the X-data bus 24 couples to the I-data bus by way of the transceiver 69. The I-data bus 30 in turn couples to the controller output bus 33 by way of the transceiver 31. Similarly, the I-address bus 32 intercouples between the X-address bus 26 and the controller address bus 36. The intercoupling is provided by means of transceivers 29 and 35. The microprocessor that has control of the X-BUS, at that instant in time, is the only one that can access the I-bus. In this regard, X-BUS contention logic is used for controlling access to the X-BUS. The X-BUS contention logic is illustrated in FIG. 3 at 73. It is furthermore to be noted that either the receive microprocessor 10 or the transmit microprocessor 12 can access the X-data bus 24.

In addition to the receive data bus 14 associated with the receive microprocessor 10, there is also a receive address bus 16 associated with the receive microprocessor 10. The receive address bus 16 also intercouples to the firmware prom 70. A decode of the address bus 16 also occurs and in this connection refer in FIG. 3 to the receive address decoder 76. The decoder 76 decodes higher order bits of the address bus 16.

The decoder 76 has illustrated at the output thereof three separate lines that indicate decodes for communication with different system components. For example, one decode at output line 77 indicates data access to the receive microprocessor prom 70. Another decode at line 78 indicates data access to the X-RAM 22. Still a further decode at line 79 indicates data transfer from the fifo 60.

In the block diagram of FIG. 3 also refer to the transmit address bus 20. It is noted that there is also a transmit address decoder 80 coupled from this address bus. This decoder 80 also has three output lines coupled therefrom. A first decode at line 81 indicates data transfer from the transmit microprocessor prom 84. In this regard, it is noted that the firmware prom 84 is a 16K by 8 bit prom that couples to both the transmit data bus 18 and the transmit address bus 20. The address decoder 80 has a second decode output at line 82 that decodes access to the X-RAM 22. There is also a third decode at line 83 from the transmit address decoder 80 indicating data transfer to the DUSCC bus 48.

Because the transmit microprocessor 12 cannot hardwarewise access the fifo 60, the same address space is used for the data circuits 44 on the transmit microprocessor. Similarly, the receive microprocessor 10 cannot physically address the data circuits 44 as neither the address nor data busses couple directly thereto. Therefore, that address space is used for the receive data fifo 60.

Either of the microprocessors 10 or 12 may access an address space that points to the I-RAM 28. In the disclosed embodiment this is an address base between 16,000 hexadecimal and 18,000 hexadecimal. Access to the I-RAM 28 is via the X-BUS (data bus 24 and address bus 26).

Also illustrated in FIG. 3, and referred to hereinbefore, is the X-BUS contention logic 73. The inputs thereto are two separate signals indicating that the receive microprocessor wants to go to the X-RAM 22 or the transmit microprocessor wants to go to the X-RAM 22. These signals are coupled to the logic 73 on lines 85 and 86. Similarly, there are outputs on lines 87 and 88 which are identified in FIG. 3 as respective signals R2XBUS and T2XBUS. The bus contention logic 73 basically permits one but not both processors to access the X-RAM. Again, the respective signals are the signals R2XBUS at line 87 and T2XBUS at line 88. It is noted that these signals couple respectively to the address multiplexers 90 and 92 as enable inputs thereto. The XBUS contention logic 73 is considered to be of well-known conventional design.

Reference is also made to further circuit details of portions of the block diagram of FIG. 3 as set forth in co-pending application listed above.

Presuming that one of the microprocessors 10 and 12 has in fact asked for and received the X-BUS, the addresses from the microprocessor couple by way of either the receive address bus 16 or the transmit address bus 20 to the respective multiplexers 90 and 92 illustrated in FIG. 3. The multiplexer 90 receives the receive microprocessor addresses and the multiplexer 92 receives the transmit microprocessor addresses. These addresses are coupled through the multiplexers depending upon which one was enabled by the signals coupled to the enable inputs thereof. These are the respective signals R2XBUS and T2XBUS. The output of the multiplexers couples in common to the X-address bus 26.

With further reference to FIG. 3, it is noted that further decoding occurs off of the X-address bus 26. In this connection note the address line 96 coupling to the X-address bus address decoder 97. A further line 98 along with a line 99 from the decoder 97 couples to a further decoder 100. The addresses coupled to the decoders 97 and 100 are higher order bits of the address bus 26. These are decoded in the presence of an X-BUS cycle (XB5CYC) to determine whether signals are to be coupled to the X-RAM, I-RAM, S-RAM, or hardware strobes. In FIG. 3 these different signals are depicted at the output of the X-BUS address decoder 97. FIG. 3 also illustrates to the right of each of these signals the particular addresses involved. The hardware strobes are at an address of 12XXX hex, X-RAM access is decoded at an address of 10XXX hex, the S-BUS access is at address 14XXX hex, and the I-bus address is at 16XXX hex.

In FIG. 3 reference has been made to the X-BUS address decoder 97. This is the same decoder as illustrated in FIG. 2 of the aforementioned application Ser. No. 032,902 as decoder 97 and there is shown therein the four output signals. On the first line is the signal XRAMEN which is the XRAM enable signal. On the next line is the signal XREGEN which is the hardware strobe register enable. The next line is the signal SBUSAC which is the S-RAM access signal. Finally, on the last line is the signal IBUSAC which is the I-RAM access signal. With regard to the reference to the S-RAM, it is noted that this device has not been described herein as it is not believed to be necessary in the explanation of the concepts of the present invention.

The four outputs from the channel selector prom 104 couple to the two registers 106 and 108. These are the respective receive channel number register and the transmit channel number register. Both of these registers are four bit registers.

Multiplexers 90 and 92 drive either the straight-through microprocessor addresses or the microprocessor addresses with the line number substituted for the middle bits. Also, the transmit multiplexer drives the transmit straight-through microprocessor addresses or the microprocessor with the line number substitutes for the middle bits.

As previously indicated, the X-BUS and the X-RAM along with the I-BUS and the I-RAM can be addressed either in a direct mode or in a line page mode by either microprocessor. In this regard, in FIG. 3 it is noted that, for example, the receive address bus 16 couples directly without any bit substitutions to one side of the multiplexer 90. Similarly, the transmit address bus 20 also couples directly to one side of the multiplexer 92. This alternate form of addressing of the X-address bus 26 occurs because there are some instances in which control is in a non-line number context such as in an interrupt mode when one has to handle something for a line, it is not known what line it is, and in fact it may be a line other than the line being operated upon.

Reference is now made to the somewhat more detailed diagram of FIG. 4 illustrating the I-RAM 28 and associated data bus 30 and address bus 32 previously referred to in FIG. 3. Associated with the I-RAM 28 is a V (validity) BIT RAM 27. The V-BIT RAM 27 couples to the interface X-data bus 24 by means of a transceiver 43. Operation regarding the V-RAM 27 is discussed in further detail hereinafter.

Also illustrated in FIG. 4 are control elements 160, 164 and 168. These control elements may be implemented by programmable array logic that will be described in further detail hereinafter. The control elements include a first control elements 164 for CRI posting control. The second control element 160 is a CRI end control. The last control element 168 is for V-BIT and I-BUS control. The control element or PAL 164 as well as the other PAL's 160 and 168 all receive I-address and I-data bus signals as illustrated in FIG. 4. The PAL 168 generates the V-BIT write signal and also controls certain transceivers as will be described in further detail hereinafter.

Also illustrated in FIG. 4 is the CRI flip-flop 170 that receives signals from both the PAL 160 as well as the PAL 164. Also illustrated in FIG. 4 is the interrupt logic L1 coupling from both PALS 160 and 164. The output from the logic L1 couples to the microprocessor controller. This generates the interrupt signal previously referenced in FIG. 2 as interrupt line 3. The description of the flip-flop 170 and the logic L1 is taken up hereinafter in connection with the more detailed diagrams.

In accordance with the present invention, rather than having transmit and receive registers associated with each line as in the past, a random access memory is employed, namely the I-RAM 28 illustrated in FIG. 4. In this connection, instead of having up to 16 interrupts outstanding to the multi-line controller at any given time, there is only one interrupt that is posted at a time on the interface to the multi-line controller. There is thus provided a control mechanism for presenting the CRI interrupt to the multi-line controller and for in addition transferring to the multi-line controller the line number and the direction or in other words, whether it is a transmit or a receive interrupt. This information is transferred through the interface to the multi-line controller.

FIG. 4 also illustrates certain of the locations in the I-RAM 28. These locations basically relate to line register locations 0–5. In particular, there are four addresses in sequence numbers 0–3 that are in particular of interest. Specifically locations 1 and 3 serve as the transmit and receive data buffers. Thus in location 1 is stored the receive data and in location 3 is stored the transmit data. There are validity bits stored in the V-BIT RAM 27 associated with each of these two addresses. In this connection in FIG. 4 note at location 27A the transmit validity bit and at location 27B the receive validity bit.

From the multi-line controller side, when either transmit or receive data register locations are accessed in the I-RAM 28, the validity bit associated with them is set. In this case the setting of the bit indicates that it is set to a "1" state. This indicates that these data register locations 1 and 3 in the I-RAm 28 have been accessed by the multi-line controller since the last time that the microprocessor or microprocessors in the microprocessor controller 8 posted a CRI. In this connection it is noted that the multi-line controller only writes into the trasmit data address 3 and only reads from the receive data address 1.

On the microprocessor controller 8 side the transmit and receive microprocessors previously referred to but not specifically shown in FIG. 4, actually post a CRI request for the multi-line controller 4. This is carried out in a CRI cycle by using specialized address bits, to be defined hereinafter, for posting an interrupt. In posting a CRI what actually occurs is that under microprocessor controller 8 initiates a "read" in which the line register 2 location in the I-RAM 28 is accessed. This is the control location illustrated in FIG. 4 in the I-RAM 28. If the conditions are proper, as will be discussed hereinafter, to post a CRI, then the line number and direction (TX or RX) associated with that posting is stored in a register referred to as the CRI channel number register illustrated hereinafter in FIG. 5A. That register then generates a signal coupled to the multi-line controller (MLC) to inform it of the fact that the CRI is present and allow it to read the line number and direction to which that CRI belongs so that the multi-line controller can then start-up the correct process.

FIG. 4 also illustrates at location LR2 certain control bits that indicate whether the receive function is "on" and similarly when the transmit function is "on". With respect to the control location in I-RAM 28, this control data is controlled from the multi-line controller and in particular from a channel control program (CCP) stored therein.

Reference has been made hereinbefore to the capability of essentially making the I-RAM 28 interactive by associating therewith the V-RAM 27. The V-RAM is used to indicate fullness or emptiness of the associated data register in the I-RAM 28. When posting a CRI, the content of register LR2 in the I-RAM 28 have to be examined and, in the case of data transmission, the fullness of the transmit register, namely location TXDATA also is examined. If the conditions for setting the CRI are met, the details of which are discussed hereinafter, a CRI can be set and will remain set until some action by the multi-line controller. These actions relate to one of three memory locations illustrated in FIG. 4 as locations 1-3.

By monitoring all MLC accesses during the MLC bus cycle when they occur, by means of the control logic to be described hereinafter, there is provided a reset of the CRI interrupt. In connection with the posting of CRI's, reference is made to the description hereinafter, in particular in connection with FIG. 5A and the PAL's 160, 164 and 168 for the control of CRI posting, CRI failure to post and CRI termination.

Figure 5B:
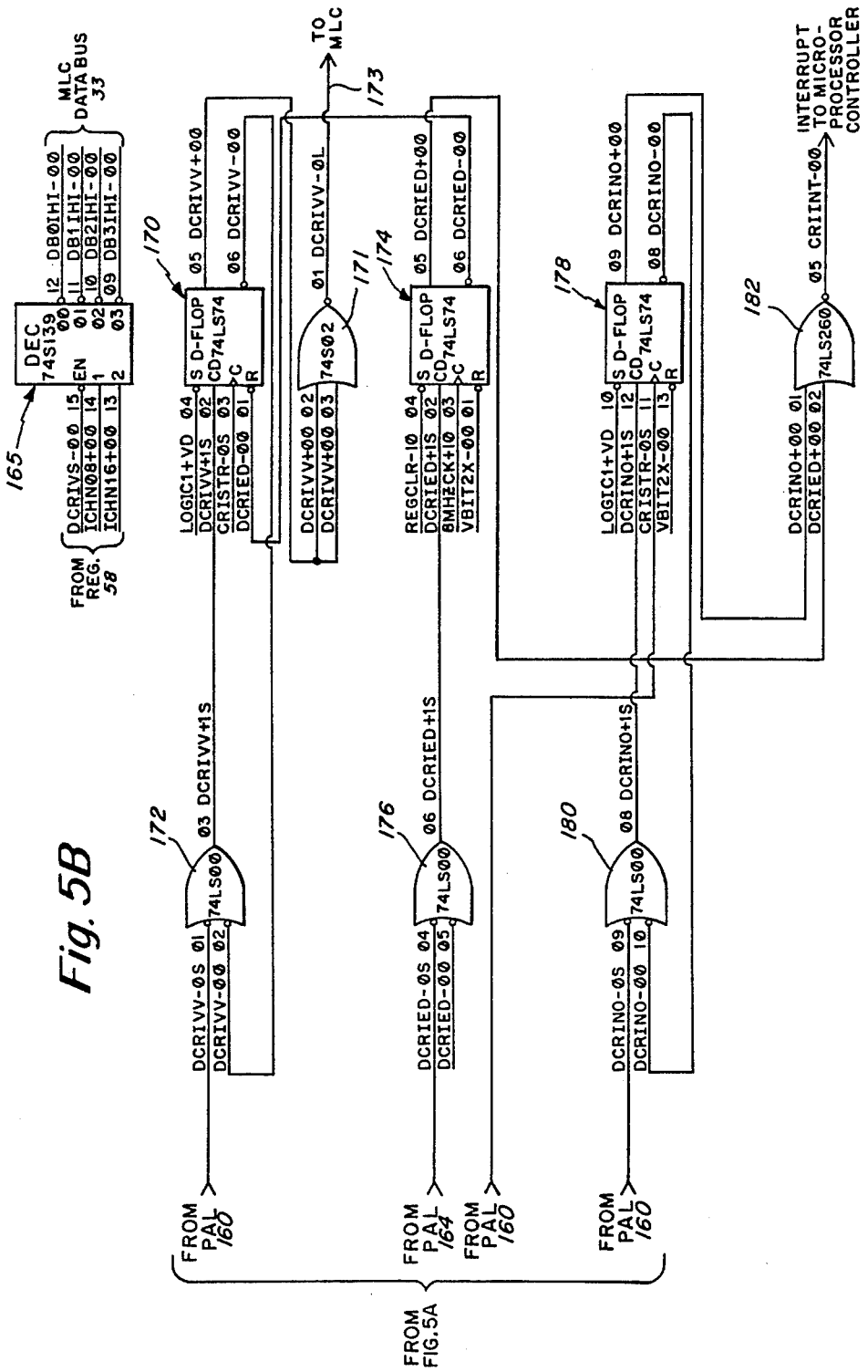
Figure 6A:
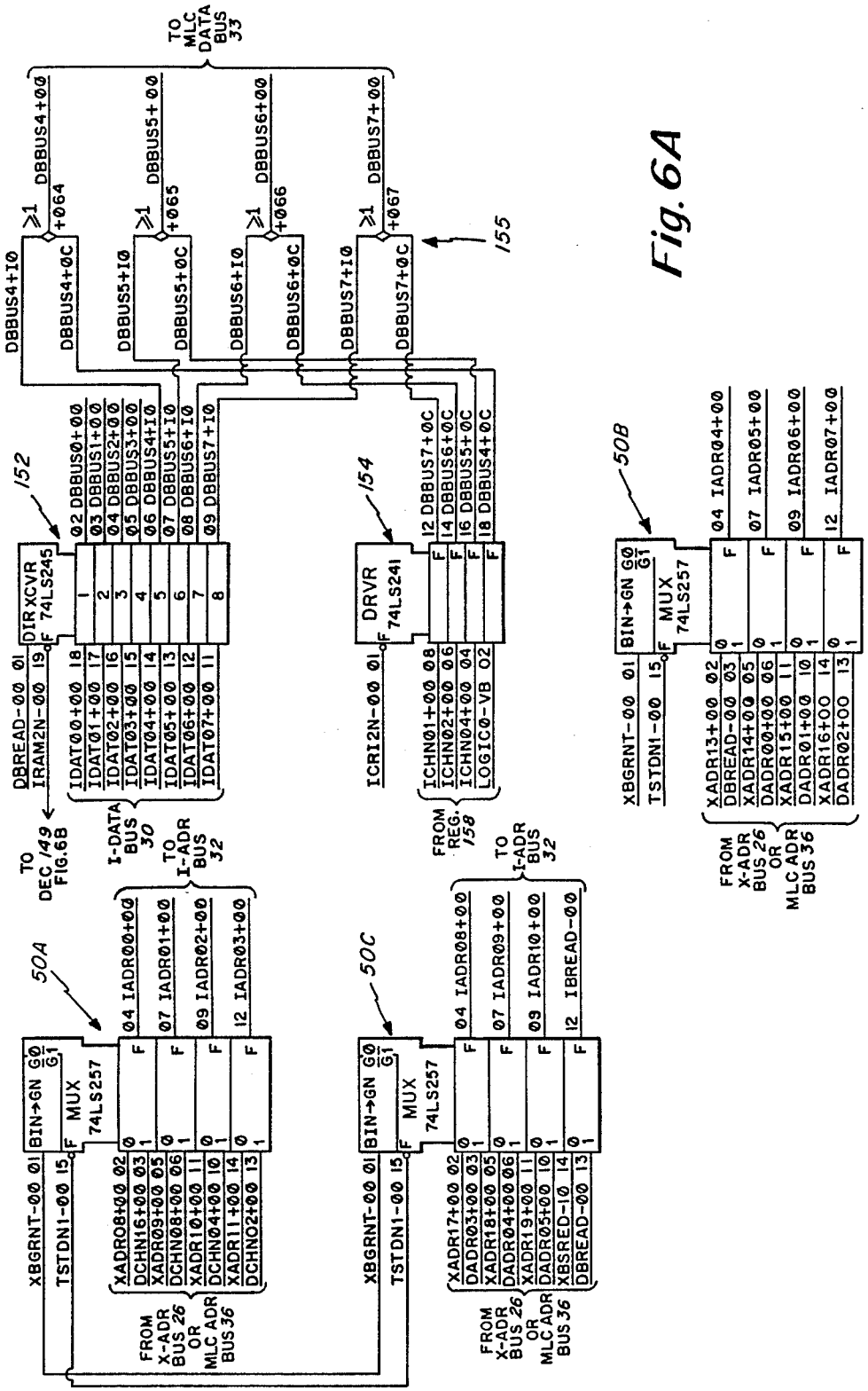
FIGS. 6A and 6B are detailed logic block diagrams of further portions of the interface of the present invention including, interalia, address multiplexers, the interface memory (I-RAM) and the V-BIT memory.
Figure 6B:
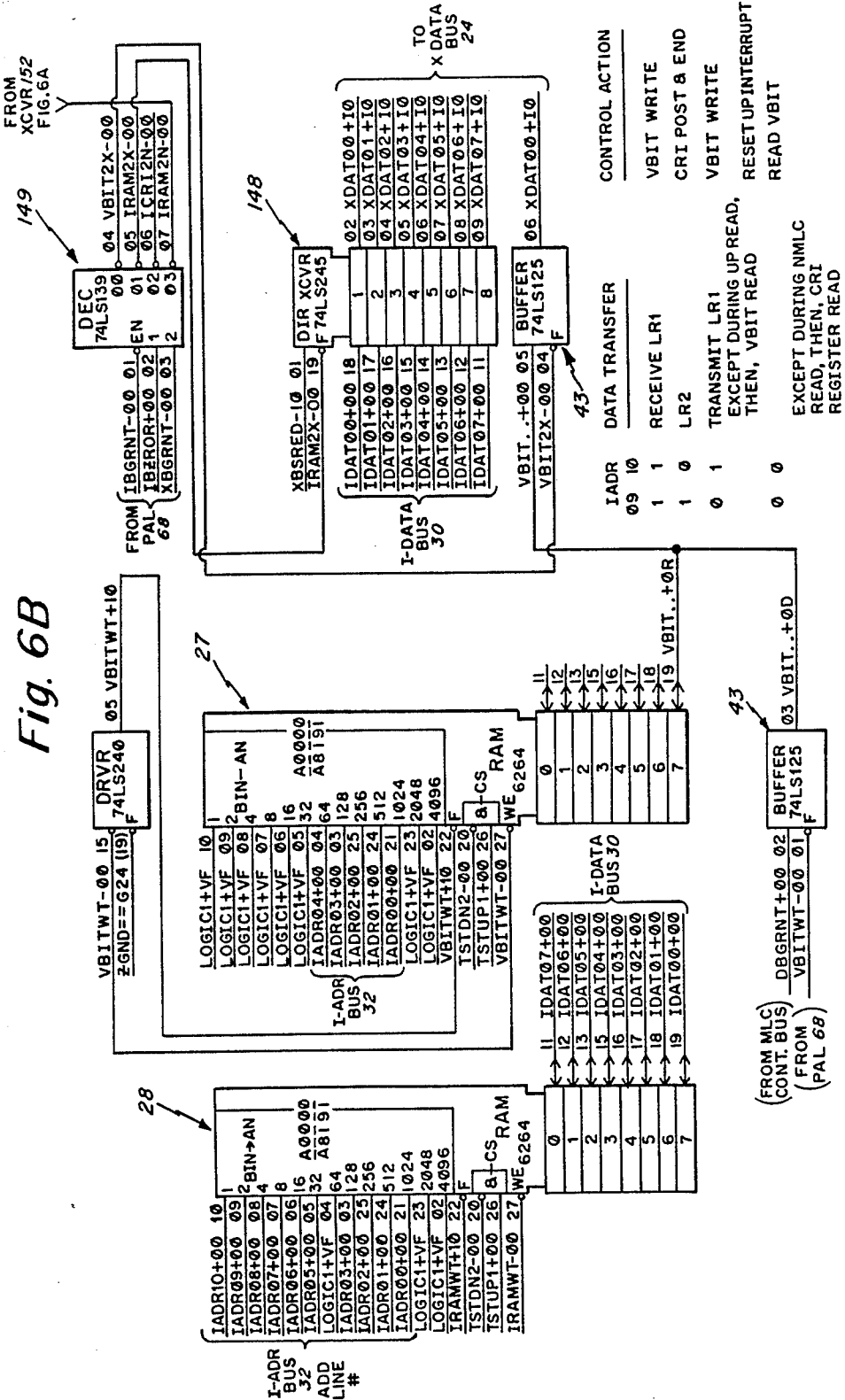

Reference is now made to FIGS. 5A and 5B along with FIGS. 6A and 6B for further details of a particular implementation of the interface apparatus of the present invention. FIG. 6B illustrates the I-RAM 28 having six address lines IADR05-IADR10 coupling thereto. There are also four addresses identifying the line number. These are addresses IADR00-IADR03. Also coupled to the I-RAM 28 is a write control signal IRAMWT.

Also disclosed in FIG. 6B is the V-BIT RAM 27. The writing into RAM 27 is controlled from the signal VBITWT. Coupled to the address inputs of the V-BIT RAM 27 are addresses IADR00-IADR04. The output from the V-BIT RAM 27 is the signal V-BIT.

With respect to the I-RAM 28 it is furthermore noted that the data lines associated therewith couple to the I-RAM data bus. These are represented by data signals IDAT00-IDAT07. This is the 8 bit data bus of the interface as identified previously in FIG. 4 as I-RAM data bus 30.

FIG. 6B also illustrates one of the control transceivers 148 as well as a decoder 149. It is noted that the transceiver 48 controls the transfer of data from the interface data bus 30 to the X-data bus 24. The transceiver 148 is controlled by the signal XBSRED which is an X-BUS read signal, as well as the signal IRAM2X which indicates a transfer from the I-RAM 28 to the X-BUS 24. The signal IRAM2X it is noted is coupled from one of the outputs of the decoder 149. The decoder 149 is discussed in further detail hereinafter.

Figure 6C:
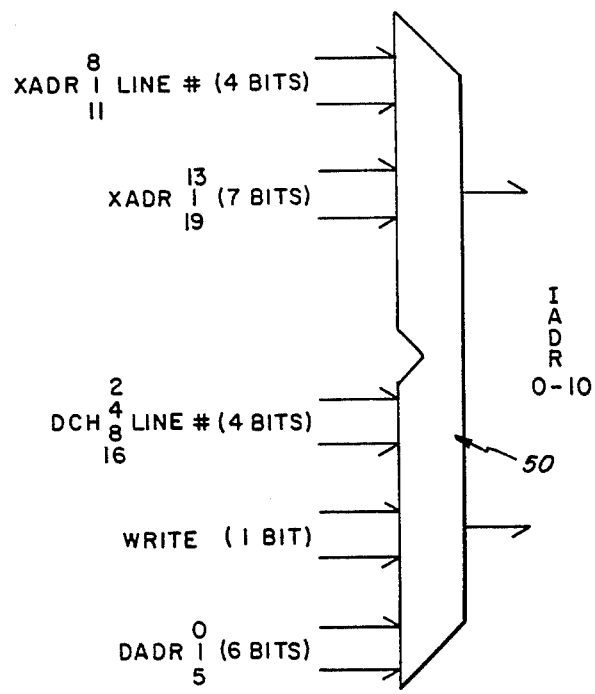
FIG. 6C is a block diagram of the multiplexer shown in FIG. 6A illustrating the address signals.

FIG. 6 illustrates a multiplexer which is constructed of three separate multiplexer circuits 50A, 50B and 50C. There are, of course, two separate sets of inputs to these multiplexers. One set of inputs is from the X-address bus 26 and the other set of inputs is from the multi-line controller (MLC) address bus 36. The X-BUS addresses are addresses XADR08-XADR19. The MLC address signals are signals DADR00-DADR05 along with the channel identifying signals DCHN02, DCHN04, DCHN08, and DCHN16. In this regard also refer to the multiplexer diagram of FIG. 6C illustrating a single multiplexer 50 with the proper address designations.

The outputs of the multiplexers 50A, 50B and 50C in FIG. 6A (likewise the output from essentially the same multiplexer 50 in FIG. 6C) are the interface addresses IADR00-IADR10. The other output is the interface bus read signal IBREAD.

FIG. 6A also shows one of the other transceivers, namely transceiver 152. It is noted that the inputs to this transceiver are the interface bus data signals, namely signals IDAT00-IDAT07. The output signals from the transceiver 52 are the MLC data bus 33 signals, namely signals DBBUS0-DBBUS7. Again, this is the same data bus previously illustrated in FIG. 2 intercoupling between the interface 6 and the multi-line controller 4 (also refer to FIG. 4 and data bus 33).

The transceiver 152 is controlled by basically two signals. One of the signals is the signal DBREAD which is the data bus read signal indicating that the transceiver is enabled when there is to be a transfer from the interface bus 30 to the MLC bus 33. The other signal is the control signal IRAM2N. This is a signal coupled from the decoder 149 and is indicative of a transfer of data from the I-RAM 28 to the MLC data bus 33.

Finally, in FIG. 6A there is a driver circuit 154 that receives signals ICHN01, ICHN02 and ICHN04 from the channel number register 158 of FIG. 5A. These signals are designated as data bus signals DBBUS4-DBBUS7. These signals are applied to an output OR circuit 155 as indicated. This OR circuit 155 determines that the data bus signals on the MLC bus 33 may be derived either from the I-data bus 30 or from the channel number register 58.

As indicated previously, when either a transmit or receive CRI is posted on the interface, the line number and direction (TX/RX) associated with that posting is stored in a register. In this connection refer now to FIG. 5A and the channel number register 158. It is noted that this register is clocked by the signal CRISTR. This is the CRI strobe signal taken from one of the control elements, identified in FIG. 5A as the programmable array logic (PAL) 160. Set forth hereinafter are equations and further explanations regarding the PAL 160.

In connection with the channel number register 158, the address input XADR12 is the address bit that is used to initiate a CRI posting. Thus, as long as this bit is present and the CRI strobe signal clocks the register, there will then be an output indicating a CRI posting and identified in FIG. 5A at the output of register 158 as the signal ICRIVV. It is noted that this signal also couples to the comparator 162, to be described in further detail hereinafter, providing a signal that looks for an equal comparison at the comparator 162.

As previously referred to in FIG. 6C, the addresses XADR08-XADR11 designate one of sixteen possible lines. The remaining address signal XADR13 is the address bit whose state indicates whether it is a transmit or receive operation. The state of the address bit is latched in as an output signal indicated as signal ICHN01. This signal has either a binary "1" or "0" level depending upon whether it is a transmit or receive CRI that is posted. This signal couples as one input to a second control element, identified in FIG. 5A as the PAL 164.

The output signals from the register 158 include signals ICHN01, ICHN02 and ICHN04. These signals are applied to the aforementioned driver 154. Also, there are the signals ICHN08 and ICHN16. These signals are applied to the decoder 165 that simply uses these two bits as decoded outputs that couple to the MLC 4 to indicate the selected line.

FIG. 5A also shows the previously mentioned comparator 162 which makes a comparison between the addresses presented on the interface bus, which comprise the channel number selection from the MLC and the posted addresses from the register 158. The first set of signals are identified as address signals IADR-00-IADR03. The other signals from the register 158 are the signals ICHN03, ICHN04, ICHN08 and ICHN16. The output signal indicating a comparison from the comparator 162 is the signal ICHNEQ which indicates that the MLC is transferring data to the I-RAM 28 or receiving data from the I-RAM 28 on the same line on which there is a CRI posted. It is noted that the signal ICHNEQ couples to the PAL 164 which is the PAL that control the end of the CRI posting cycle. In this connection refer to the timing diagram of FIG. 7 in connection with the CRI posting cycle.

FIG. 5A also shows gates 166 and 167 for providing certain control signals to the PALS 160, 164 and 168. The gate 166 is an AND gate that receives the interface data bus signals IDAT01 and IDAT07. The signal IDAT01 when set to a "one" indicates that data is to be transmitted rather than received. The signal IDAT07 state indicates a transmit CRI enable. The output of the gate 166 is the signal IDATT0 which couples to both the PAL 160 as well as the PAL 164. The gate 167 is a NOR gate that has at its input the address signals IADR05–IADR08. The output signal is the signal IADRL0 which couples to the PAL 168.

Reference is now made to FIG. 5B illustrating additional control logic. This includes one flip-flop 170 that may be identified as the CRI flip-flop. This flip-flop is also referenced in FIG. 4. It is noted that this flip-flop is clocked from the signal CRISTR which is the CRI strobe signal from the PAL 160. The data input to this flip-flop is the signal DCRIVV which is coupled by way of recirculating gate 172 from the PAL 160. The signal DCRIVV is indicative of the posting of a CRI. It is noted that the flip-flop 170 is reset by a signal DCRIED which is the CRI end signal coupled from a second flip-flop, namely flip-flop 174. Flip-flop 174 indicates the end of a CRI. This flip-flop is clocked from a system clock signal. The data input to the flip-flop 174 is the signal DCRIED which is coupled by way of the recirculating gate 176 from the PAL 164. The particular output from the PAL 164 is the signal DCRIED which is indicative of the end of a CRI.

FIG. 5B also illustrates a further flip-flop 178. This flip-flop is also clocked by the signal CRISTR which is the CRI strobe signal from the PAL 160. The data input to the flip-flop 178 is the signal DCRIN0. This signal is derived by way of recirculating gate 180 from the PAL 160. The output signal from the PAL 160 is the signal DCRIN0 which is the CRI failure signal. This indicates that the CRI posting cycle failed. Finally, illustrated in FIG. 5B is the NOR gate 182. It is noted that this gate receives the signals DCRIN0 and DCRIED and provides an output signal CRIINT. This is an interrupt signal adapted to interrupt the microprocessor at the microprocessor controller 8. An interrupt is sent back to the microprocessor if there is either a CRI failure or an end of a CRI. In this connection also refer to FIG. 2 and the interrupt line 3.

The handling of receive CRI's is less complicated than the handling of transmit CRI's. Because one is emulating multiple double buffered USART's, data can be fed in advance but an interrupt is only posted when a new data byte is needed. The system handles data transfer to the transmit register either before or after the interrupt occurs. As long as the data is handled at the right frequency and the occurrences do not happen too often then the transmission is proper. Thus, there must be accommodation for a situation in which one waits for a transmit interrupt to occur and then writes the transmit byte. The other alternative is to write the transmit byte from time to time in advance of reception of the interrupt. The technique of the present invention accommodates both of those practices and furthermore operates with a single CRI at a time actually outstanding.

On the microprocessor controller side of the interface, the posting of CRI's occurs under firmware control. In this connection, refer to the related copending applications. The receive characters to be delivered off the queue, are posted onto the interface for the MLC 4. Similarly, a request for transmit characters are taken off the queue and transmit CRI's are posted to the MLC 4. In this connection there is described herein the apparatus for controlling access to the interface area from both the microprocessor controller and the MLC. This control also is for transmitting other kinds of information across the interface in such a way that the transfers are carried out efficiently. Furthermore, upon the posting of a CRI and the fulfillment thereof, there is furthermore a signalling back to the microprocessors that the operation has been completed (output signal CRIINT from gate 182). This is carried out with interrupts. An interrupt level is used to indicate that the CRI is completed.

There are other kinds of status data that are passed back and forth through the interface area and in connection therewith there is provided for dual port memory control at the I-RAM 28. This permits reading and writing by either the microprocessors 10, 12 or from the MLC 4 area. In connection with the control through the interface, there is provided a scheme to know when the MLC is requesting a cycle and to give the MLC priority over other cycles so as to not slow it down. It is furthermore noted that the I-RAM 28, and in particular the access thereto, is controlled under certain bus control signals, primarily controlled from the PAL 168 in FIG. 5A to provide dual port control to the I-RAM 28 so that either the controller 8 side or the controller 4 side can read and write memory locations to be accessed by the other.

DESCRIPTION OF OPERATION

In connection with the description of operation regarding data communication, reference is made to the general block diagram of FIG. 1B as well as the more detailed block diagram of FIG. 4. The following discussion also includes a discussion of the operation of the control elements of FIG. 4, primarily the operation of the PAL's 160, 164 and 168 along with descriptions of the associated equations found in Appendices hereto.

As noted in FIG. 1B, the line adapters in the form of multiple USART's are replaced by a microprocessor controller 8 as depicted in FIG. 1B including a part thereof communication chips 44. In this regard, also refer to the more detailed block diagram of FIG. 3 and the DUSCC chips 44. Also illustrated in FIG. 1B is the interface area 6 with the I-RAM 28 and the V-BIT RAM 27 being illustrated schematically therein.

Under microprocessor control per the controller 8, and in accordance with program control in the computer 2 and MLC 4, data is transferred bidirectionally (transmit and receive), between the multi-channel controller 4 and the HDLC-type communication lines via the microprocessor controller 8. This control is carried out by the posting of character request interrupts.

In connection with the description of operation, reference is also now made to FIG. 2 in which, in the interface area 6, there is disclosed in a schematic fashion means for generating a character request interrupt which is actually controlled from the microprocessor controller 8 and established in the interface area 6. The line 7 in FIG. 2 shows this signal being coupled down to the multi-line controller 4. FIG. 2 also describes the initiation of an interrupt via the interrupt line 3 from the interface area 6 to the microprocessor controller 8. In this connection, also refer to FIG. 7 that describes the CRI line as well as the interrupt line and also indicating the relative timing regarding the access of the multi-line controller 4 to the data that is stored in the I-RAM 28.

Figure 7:
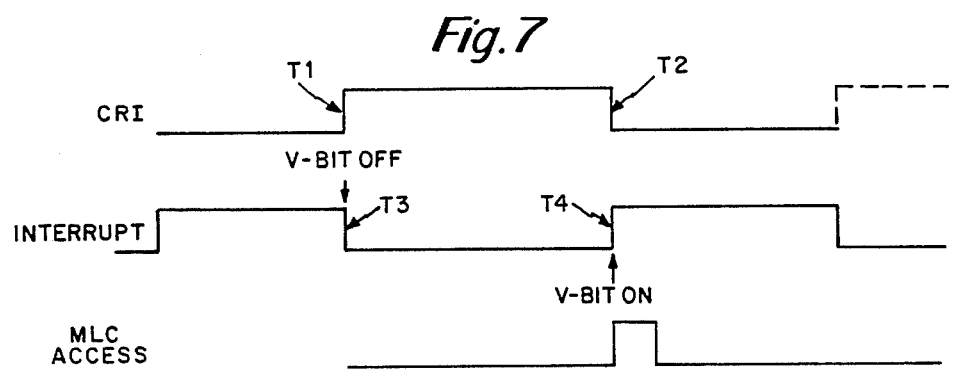
FIG. 7 shows illustrative interrupt signals.

FIG. 7 illustrates, from a CRI standpoint, both the posting and ending of a CRI. The posting of a CRI is indicated at the transition T1. The ending of a CRI is indicated at the transition T2. Similarly, in the second waveform the transition at T3 is a transition indicating ceasing of the interrupt. The transition at T4 indicates the initiation of an interrupt signal as coupled on the line 3 in FIG. 2 to the microprocessor controller 8.

To post a receive CRI the data byte from the location RXCRID in the X-RAM line table is moved to the receive data location, namely location 1 in the I-RAM 28. A CRI is then actually posted as indicated by transition T1 in FIG. 7 by the microprocessor reading location 2 namely a location 2 (LR2) namely the control location in the I-RAM 28.

A transmit CRI is posted by also reading the control register LR2. Either receive or transmit posting clears the associated V-BIT as indicated by the second signal in FIG. 7 indicating that the V-BIT is off at transition T3.

With respect to the posting of a CRI, reference is made hereinafter, to the description in connection with the PAL 160. With respect to the generation of an interrupt back to the microprocessor controller, reference is made to FIG. 5B and the flip-flops 170, 174 and 178 along with the gate 182.

With respect to the ending of a CRI, reference is made hereinafter to the PAL 164 illustrated in FIG. 5A. This controls the transition T2 in FIG. 7. For the ending of a receive CRI, the associated V-BIT is moved to the line table in the microprocessor controller 8. The MLC accesses the receive data register of the I-RAM 28. In this connection refer to the MLC access signal which is shown as a third signal in FIG. 7.

The ending of a CRI can occur if there is a CRI outstanding and transmit or receive functions are terminated. Also, if the MLC writes data into the I-RAM or reads data therefrom on the appropriate channel then the CRI is satisfied and the CRI terminates as illustrated by the transition T2 in FIG. 7. This operation also creates the initiation of an interrupt illustrated at transition T4 in FIG. 7 described in further detail hereinafter in connection with the circuitry in particular as shown in FIGS. 5A and 5B.

As indicated previously, the ending of a receive CRI means that the validity bit is moved to the line table. The validity bit associated with the receive function is moved to the line table. In connection with the ending of a transmit CRI both the V-BIT and the transmit data are moved to the microprocessor controller line table.

Figure 8:
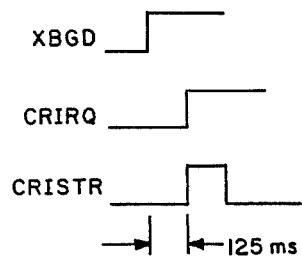
FIGS. 8 and 9 show timing wave forms associated with two of the control PALS illustrated in FIG. 5A.

Next is a discussion of the operation of the PAL 160. This device controls the posting of both transmit and receive CRI's. In this connection, any access to the interface data bus with the address bit XADR12 "on" causes the generation of certain timing waveforms as illustrated in FIG. 8 by the signals XBGD, CRIRQ, and CRISTR. In FIG. 8 all of the signals are drawn in positive logic for simplicity sake.

To post a receive CRI the data byte from the location RXCRID in the X-RAM line table is moved to the receive data location, namely location 1 in the I-RAM 28. This is address 16X03 where X is the line number.

In accordance with one unique feature of the present invention the actual posting of the CRI is initiated by reading line register 2 (LR2) in the I-RAM 28. This is the control location as illustrated in FIG. 4. In connection with CRI posting also refer to the equations for PAL 160 set forth in Appendix A.

In connection with the inputs to the PAL 160, the signal IBUSAC indicates that the microprocessor controller wants the I-BUS. The signal XBGRNT indicates that access goes to the microprocessor controller. Also coupled to the PAL 160 are the X-address signals XADR12 and XADR13. There are also I-BUS data signals IDATT0 and IDAT06. Finally, there is the signal V-BIT also coupled to the PAL 160.

There are basically three output signals from the PAL 160. these are the signals CRISTR which is the CRI strobe, the signal DCRIN0 which indicates a CRI post failure and the signal DCRIVV which indicates a CRI posting.

Reference is now made to appendix A and the equations for PAL 160. As far as the CRI posting is concerned this involves the signal DCRIVV. The address bit XADR12 has to be set indicating that this is a posting. The address bit XADR13 is either a "1" or "0" depending upon whether it is a transmit or receive CRI. The first condition in which the bit XADR13 is a "1" is for transmit and the second condition listed in Appendix A in which the bit XADR13 is a "0" is for the receive function.

With respect to the transmit interrupt, the signals IDAT01 and IDAT07 are "on" (satisfied) and the V-BIT has not been set. In connection with a receive interrupt, the signal IDAT06 is "on" (satisfied). Under either of those conditions a CRI is posted and there is generated an output transition at the signal DCRIVV. This signal couples by way of gate 172 to the flip-flop 170 setting this flip-flop and coupling a signal by way of gate 171 to line 173. This signal couples to the multi-line controller to indicate to the multi-line controller that a character request interrupt has been posted.

In connection with the operation of the PAL 160, it is noted that a CRI is not posted if the signal IDATT0 is "0" meaning that the transmit function is off, or if the signal IDAT06 is likewise "0" meaning that the receive function is off. Also, if the signal V-BIT is set, a CRI is not posted because this is an indication that data is already in the I-RAM 28 in the data locations for receive and transmit data.

With further reference to the equations for PAL 160, it is noted that there are three conditions upon which the signal DCRIN0 is generated. For example, if the MLC has nothing to transmit or receive, it will write a "0" into the control bit positions in line register 2 in the I-RAM 28. Thus, there are specific control locations in LR2 that can be sensed upon a read of LR2 to determine whether a CRI is to be posted.

The aforementioned conditions are indicated in the equations in which the signals IDATT0 and IDAT06 are both reset indicating that the transmitter and receiver are turned off. Also refer to the end of appendix A where these conditions are set out. There is also one other condition in which the V-BIT has been set. The setting of the V-BIT indicates that the MLC has read previous data from or written previous data into the data locations in the I-RAM 28 and thus likewise a transmit CRI is not to be posted. These three conditions as illustrated in the equations are indicative of a CRI posting cycle failure. As indicated previously, this generates the signal DCRIN0. This signal couples by way of gate 180 to the flip-flop 178 for causing a setting thereof. The output signal therefrom couples to gate 182 for providing an interrupt signal, identified in FIG. 5B as the signal CRIINT which is an interrupt from the interface area 6 to the microprocessor controller 8. This signal indicates to the microprocessor controller 8 that the MLC 4, for example, has nothing to transmit.

The setting of a validity bit in the validity bit RAM 27 occurs whenever the MLC 4 either transfers data to the I-RAM 28 or reads data from the I-RAM 28. The MLC 4 only writes data into the transmit data location and only reads data from the receive data location. If the MLC 4 writes data into location TXDATA (see FIG.

4) because of a past CRI then at that time the associated validity bit is set. Likewise, if the MLC reads data from location RXDATA the validity bit is also set. It is the validity bit that is later sensed by the PAL 160 to determine whether a transmit CRI is to be posted.

Upon reading the control location of the I-RAM 28, and if the CRI is to be posted, then the line number and the direction of the transmission along with the fact that the CRI is posted are stored in the CRI register 158. The address signals XADR08–XADR11 indicate the line number. The address XADR12 indicates that a CRI is to be posted. The address XADR13 indicates transmit or receive.

The outputs from the register 158 drive signals to the MLC as discussed previously by way of the decoder 165 in FIG. 5B and the driver 154 in FIG. 6A. The MLC 4 is then permitted to read the line number and direction to which that CRI belongs so that it can start-up the right process.

After a CRI has been posted, the MLC 4 may at some later time deliver the data into the transmit data location in the I-RAM 28. When that occurs there is to be an interrupt back to the microprocessor that indicates that the data has arrived. At the time that the data is written into the transmit data location in the I-RAM 28, the associated validity bit is set as at 27A in FIG. 4.

Now, in FIG. 5A reference is also made to the comparator 162 which performs a comparison between the output of the channel number register 158 and the I-BUS 30 addresses IADR00–IADR03 as selected from the MLC 4. The output from the comparator 162 is the signal ICHNEQ. As indicated previously, this couples to the PAL 164. The PAL 164 controls the CRI end. In this connecton also refer to Appendix B which sets forth the equations for PAL 164.

In connection with the inputs to the PAL 164, reference has been made hereinbefore to the signal ICHNEQ. There is also coupled to the PAL 164 the signal ICHN01 from the channel register 158. This indicates whether it is a transmit or receive. Another input is the signal IADRL0 which couples from the output of the gate 167. There are also the address bits IADR09 and IADR10, along with the signal IADTT0 which couple from the output of the gate 166.

The output from the PAL 164 is primarily the signal DCRIED which indicates a CRI end. This signal couples to the gate 176 and from there to the flip-flop 174. The flip-flop 174 may be considered as the CRI end flip-flop.

Figure 9:
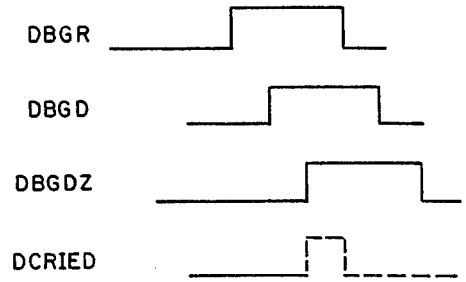

Reference is now made to the equations for PAL 164 in Appendix B. There are basically four conditions upon which the signal DCRIED is generated. Before considering these four conditions, reference is also now made herein to the timing diagram of FIG. 9 that shows certain timing waveforms associated with the PAL 164. Again, all signals are drawn in positive logic for clarity. The PAL 164 watches the MLC 4 for access to the interface bus. All MLC accesses to the bus cause the timing waveforms of FIG. 9. In FIG. 9 the signals DBGR, DBGD and DBGDZ are timing signals. Also illustrated is the signal DCRIED which is the output signal previously referred to.

With further reference to the equations for PAL 164, the first condition indicates that signal DCRIED is generated when the MLC 4 is writing to the interface and the channel numbers are equal. The signal IADRL0 presents the higher order four bits of the address bits from the MLC. This is equal to "0". This means that the access is to the data and control locations in the I-RAM 28. The signal IDAT01 being "low" indicates that the transmit function is "off" and the signal 19 indicates that a CRI is outstanding. This first condition basically indicates that, during a CRI posting the transmit operation has been turned "off" and thus the CRI is to end.

The second condition is similar except that the signal IDAT06, being reset, indicates that the receive operation is "off" with the CRI outstanding. This also causes an end of the CRI cycle.

The next condition is also an MLC write condition with the data channels being equal. This occurs when the MLC is writing data to the I-RAM 28. The last condition indicates that the MLC is reading data from the I-RAM 28. Under both of these conditions the signal DCRIED is generated indicating an end of the CRI post. As indicated previously the signal DCRIED from the PAL 164 couples by way of recirculation gate 176 to the flip-flop 174 to cause a clocking of the flip-flop to indicate an end of the CRI posting cycle.

Again, on the completion of a request it is desired to transmit a signal back to the microprocessor. For example, if a transmit CRI is present on a particular line and the MLC writes into its transmit data register then that constitutes fulfillment of that CRI. In this connection, the signal DCRIED at the output of the flip-flop 174 couples to the gate 182. The output of the gate 182 is a CRI interrupt signal that couples back to the microprocessor controller 8.

Alternatively, if a receive CRI is present and the MLC reads the receive data register then again, that constitutes fulfillment of that CRI and an interrupt is posted back to the microprocessor controller 8.

As indicated previously, in line register 2 (LR2) there are two bits that are used to control the turning "on" and "off" of the receive and transmit function. These are identified in FIG. 4 as part of the control field and identified as locations RX-ON and TX-ON. If, for example, the transmit microprocessor wishes to transmit a character and the transmit function has been turned off, then that CRI that it would have liked to have posted, will never be fulfilled. The MLC does not have anything to transmit. When the MLC has nothing to transmit it writes in the control location LR2 and writes a "0" into the control bit position. When the system then attempts to post a CRI, during the posting cycle, line register 2 is read. If one is trying to post an interrupt on that particular line and the transmit function has been turned "off", then the logic recognizes that fact, sets an immediate interrupt back to the microprocessor and it indicates that that CRI is fulfilled. In this connection that particular operation again generates an interrupt back to the microprocessor controller by way of the gate 182, (also see interrupt line 3 in FIG. 2). In the above example, the fulfillment has occurred even though there was no actual transmission of data.

The CRI posting logic, when it posts the interrupt, looks to see if the particular bit, receive or transmit, in LR2 is "off" and if it is "off" then it immediately sets the interrupt back and indicates that this CRI is complete. It also carries this out on a transmit request if the validity bit in that location is already set. This indicates that, for instance if the MLC 4 has placed the data in the transmit data register, before the CRI is posted, then again at the time the CRI is posted, it is recognized that the data is already present and an immediate fulfillment of that CRI request occurs. In that particular case there is no signal at all sent out to the MLC because the MLC considers the task already completed.

In accordance with the further control in the interface described, wwhen the microprocessor receives its interrupt, it causes a read to location "0" in the I-RAM 28. This is a location which is referred to as a validity location. See FIG. 4. When this occurs two things happen. First, any outstanding interrupts to the microprocessor are reset to indicate that the transaction is complete. Second, the validity bit associated with the outstanding CRI is read. The validity bit associated with the outstanding CRI is sent as data back to the microprocessor controller. The microprocessor in the controller (transmit or receive) can then make a test on the validity bit. If the validity bit is a "1" it indicates that the data transaction actually occurred. If on the other hand the validity bit is a "0" it indicates that the data transaction was aborted because the transmitter or receiver "on" bit was a "0". Thus, the microprocessor now has a very easy test. A single cycle read operation, that can be performed which indicates whether or not the CRI was completed with data being passed or whether it was completed or aborted by seeing the transmit or the receive function was turned "off".

Under firmware control the microprocessor simply reads the validity bit location and inserts it in the line X-RAM table. The transmit microprocessor in a suspend fashion periodically checks on the status of the last CRI. If the CRI is completed then it only needs to check the validity bit which happens to be reported back as a higher order bit of the byte to indicate whether or not it has a new byte of data and should therefor, get ready to transmit it out on the line, or alternatively whether the transmitter was turned "off" and in that case the transmit microprocessor will go to the TX-OFF state. In connection with this operation again refer to the above-referenced co-pending applications.

Reference is now made to the PAL 168 which controls, inter alia, the validity bit write sequence. The PAL 168 also generates a number of signals for bus control. In this connection, refer to the equations for PAL 168 set forth in Appendix C. Also refer to the decoder 149 equations in Appendix D. Both of these equations interrelate in providing the basic control signals that appear at the output of the decoder 149. As indicate previously, the PAL 168 provides the validity bit write signal by knowing who is accessing the I-RAM 28.

The basic input signals to the PAL 168 include the signal DBGRNT which indicates that the MLC 4 wants the I-BUS 30. There is also the signal IBUSAC which indicates that the microprocessor controller 8 wants the I-BUS 30. The signal IADRL0 is from the gate 167. There are also the address signals IADR09 and IADR10. Reference is also made to FIG. 6B that shows therein a truth table for the address bits 09 and 10. It is noted that when the address bit 10 is a "1" there is a V-BIT write signal generated. Again, reference may be made to the equation set forth in Appendix C. These equations indicate the conditions upon which the output signals are generated including the signal IRAMWT (I-RAM write signal). This signal is coupled to the I-RAM 28 as an enable signal. Another output from the PAL 168 is the signal VBITWT. This signal is coupled to the V-BIT RAM 27 also as an enable signal. There is also the signal at the output of the PAL 168 which is the signal XBGRNT. This signal indicates access to the microprocessor controller 8. The remaining two signals are the signals IBZR0R and IBGRNT. It is noted that these two latter signals couple to the decoder 149 along with the signal XBGRNT.

Reference is also now made to Appendix D that shows the manner in which, from these input signals, four output signals are derrived for controlling certain bus operation. In connection with appendix D, the first signal VBIT2X indicates the V-BIT going to the X-BUS (bi-directional). The second signal IRAM2X indicates the I-RAM 28 going to the X-BUS (bi-directional). The third signal ICR12N indicates the CRI register 158 going to the MLC 4. Note that the signal I-RAM 2X couples to driver 154 for clocking the register 158 signals to the MLC 4. The last signal IRAM2N indicates the I-RAM 28 going to the MLC 4 (bi-directional).

Having now described a preferred embodiment of the present invention, it should be apparent to those skilled in the art that numerous other embodiments and modifications thereof are contemplated as falling within the scope of the present invention as defined by the appended claims.

| APPENDIX A |||
| --- | --- | --- |
| PAL 160 EQUATIONS |||
| CRISTR | := | CRIRQ * AD12 * /XBGD + |
| | | CRIRQ * AD13 * /XBGD |
| DCRIVV | := | XBGRNT *       AD12 *  AD13 * IDATTO * /VBIT + |
| | | XBGRNT *       AD12 * /AD13 * IDAT06 |
| DCRINO | := | XBGRNT *       AD12 *  AD13 * IDATTO + |
| | | XBGRNT *       AD12 *  AD13 *            VBIT + |
| | | XBGRNT *       AD12 * /AD13 * /IDAT06 |
| XBGD | := | CRIRQ |
| CRIRQ | := | XBGRNT |
| DEFINITIONS |||
| * | = | AND |
| + | = | OR |
| / | = | Neg. |
| IBUSAC | = | Microprocessor controller wants IBUS. |
| XBGRNT | = | Access goes to microprocessor controller. |
| IDAT06 | = | IBUS data bit 6, for LR2 receiver on. |
| IDATTO | = | IBUS data bits 1 and 7, for LR2, signals TXON and TXCRI enable anded together. |
| DCRINO | = | RX CRI turned off by LR2. |
| | | TX CRI turned off by previous data. |
| | | TX CRI turned off by LR2. |
| DCRIVV | = | CRI posted for RX. |

-continued

APPENDIX A

| | |
|---|---|
| | CRI posted for TX. |
| CRISTR | = Strobe for channel number register 58. |

APPENDIX B
PAL 164 EQUATIONS

| | | |
|---|---|---|
| DCRIED | := | DBGD * /DBGD2 * WRIT * ICHNEQ * ICHN01 * IADRLO * AD09 * /AD10 * /IDATT0 * 19 + |
| | | DBGD * /DBGD2 * WRIT * ICHNEQ * /ICHN01 * IADRLO * AD09 * /AD10 * /DAT 6 * 19 + |
| | | DBGD * / DBGD2 * WRIT * ICHNEQ * ICHN01 * IADRLO * /AD09 * AD10 + |
| | | DBGD * /DBGD2 * /WRIT * ICHNEQ * /ICHN01 * IADRLO * AD09 * AD10 |
| DBGD | := | DBGRNT |
| DBGD2 | := | DBGD |

DEFINITIONS

| | | |
|---|---|---|
| * | = | AND |
| + | = | OR |
| / | = | Neg. |
| DBGRNT | = | Multiprocessor controller allows MLC to access I-RAM. |
| WRIT | = | Bus read or write (write = 1). |
| ICHNEQ | = | Channel selected by MLC is = channel NICHN01 (CRI = channel register). |
| ICHN01 | = | Low order bit of channel number,"1" if transmit, "0"if receive. |
| IADRLO | = | High order four bits of address bits from MLC = 0, means MLC is accessing LR2, TXDATA, RXDATA. |
| IDAT06 | = | I-BUS data bit 6. |
| IDATT0 | = | I-BUS data bits 1 and 7. |
| 19 | = | DCRIVV + 00 = CRI line to MLC active at this moment. |

DECODE OF SIGNAL D-CRIED

MLC writes and channel numbers are =, LR2, TXOFF with CRI outstanding.
MLC writes and channel numbers are =, LR2, RXOFF with CRI outstanding.
MLC writes TX data channels =.
MLC reads RX data channels =.

APPENDIX C
PAL 168 EQUATIONS

| | | | |
|---|---|---|---|
| IRAMWT | := | XBGRNT * /XBGD * /READ + | |
| | | DBGRNT * /DBGD * /READ | |
| VBITWT | := | XBGRNT * /XBGD * IADRLO * AD10 + | |
| | | DBGRNT * /DBGD * IADRLO * AD10 | |
| XBGRNT | := | IBUSAC * /DBGRNT | DELAY TIMING |
| XBGD | := | XBGRNT | DELAY TIMING |
| IBGRNT | := | DBGRNT + | DELAY TIMING |
| | | XBGRNT | DELAY TIMING |
| IBZROR | := | READ * IADRLO * /AD09 * /AD10 * IBUSAC * XBGRNT * XBGD + | |
| | | READ * IADRLO * /AD09 * /AD10 * DBGRNT | |

DEFINITIONS

| | | |
|---|---|---|
| * | = | AND |
| + | = | OR |
| / | = | Neg. |
| DBGRNT | - | MLC wants IBUS. |
| IBUSAC | - | Microprocessor controller wants IBUS. |
| /READ | - | Read if low - high if right. |
| IADRLO | - | High order four bits of address bits from MLC = 0, means MLC is accessing LR2, TXDATA, RXDATA. |
| IBGRNT | - | Valid access by MLC or microprocessor controller. |
| XBGRNT | - | Access goes to the microprocessor controller. |
| VBITWT | - | Write signal to the V-BIT RAM. |
| IRAMWT | - | Write to IRAM. |
| XBGD, DBGD, XBGD2 - Timing signals. | | |

APPENDIX D
DECODER 49 EQUATIONS

| | | | | |
|---|---|---|---|---|
| IBGRNT | ·XBGRNT | | ·IBZROR − | =VBIT --- XBUS |
| | | | ·IBZROR | =I-RAM --- XBUS |
| | | ·DBGRNT | ·IBZROR − | =CRI REG --- MLC |

-continued

APPENDIX D

| | |
|---|---|
| ·IBZROR | =I-RAM --- MLC |

What is claimed is:

1. An apparatus for transferring data between a microprocessor control unit coupled to a plurality of communication lines and a multi-line communications unit coupled to a computer to emulate an interface for transferring data between the multi-line communications unit and multiple line adapters according to a predetermined protocol, said line adapters each including discrete registers for holding receive data, transmit data and control information, and logic circuits, said apparatus comprising:

- an interface control unit coupled between said microprocessor control unit and said multi-line communications unit, said interface control unit including an interface memory and control elements, said interface memory having a plurality of addressable storage locations which are used to emulate the discrete registers and logic circuits of said line adapters;
- said interface memory being mapped so as to divide said interface memory into a number of groups of locations corresponding to the number of communication lines, each group of locations including a location for receive data, a location for transmit data and a control location, said locations for receive data and said locations for transmit data emulating said discrete registers for holding receive data and transmit data, and said control locations emulating said discrete register for holding control information and said logic circuits;
- said control elements generating a sequence of signals for controlling different tasks to be performed by said interface control unit; and
- means for interconnecting said control elements to said interface memory so that said multi-line communications unit is able to access different ones of said control locations for updating the status of said communication lines and for enabling said interface control unit to transfer data to said receive locations for access by said multi-line communications unit and to transfer data from said transmit locations for transmission on said communication lines in a predetermined sequence consistent with said status, said control elements accessing said control locations for establishing data which is to be transferred to and from said multi-line communications unit in accordance with said predetermined protocol of said line adapter and so as to emulate the operation of said line adapter;
- with said control elements monitoring accessing to said control locations concurrent with any access by said multi-line communications unit.

2. The apparatus of claim 1 further including a validity bit memory located in said interface control unit and having a plurality of locations, at least a pair of locations being assigned to each of said communication lines, the contents of said locations indicating how the multi-line communications unit had responded in servicing a character request interrupt received from the interface control unit.

3. The apparatus of claim 2 wherein said pair of validity bit memory locations include transmit and receive bits for indicating that the multi-line communications unit transmitted data to said interface control unit and took data from said interface control unit.

4. The apparatus of claim 1 wherein said interface memory comprises a random access memory having data and address lines coupling to both said microprocessor control unit and said multi-line communications unit.

5. The apparatus of claim 4 wherein said interface memory provides dual port access to both said microprocessor control unit and said multi-line communications unit.

6. The apparatus of claim 5 wherein said interface memory is further subdivided into a validity location that is read by the microprocessor control unit upon generation of an interrupt by said control elements.

7. The apparatus of claim 6 wherein said interface memory is further subdivided into a status location that may be read or written into from either the microprocessor control unit or the multi-line communications unit.

8. The apparatus of claim 1 wherein said control elements include a first control element for posting a character request interrupt (CRI) initiated from the microprocessor control unit.

9. The apparatus of claim 8 further including a validity bit memory having a plurality of locations; at least a pair of locations being assigned to each of said communication lines, the contents of said locations indicating how the multi-line communications unit had responded in servicing the character request interrupt.

10. The apparatus of claim 9 wherein said first control element is comprised of a first logic circuit for sensing a validity bit state to enable the posting of a CRI in the event that the validity bit is reset.

11. The apparatus of claim 10 wherein said first logic circuit comprises a programmable array logic.

12. The apparatus of claim 10 further including a CRI flip-flop responsive to said first logic circuit for setting an interrupt that is coupled to said multi-line communications unit.

13. The apparatus of claim 10 further including a second control element for controlling the end of a CRI.

14. The apparatus of claim 13 wherein said second control element is comprised of a second logic circuit for sensing, inter alia, the multi-line communications unit writing data into or reading data from said interface memory.

15. The apparatus of claim 14 further including a third control element for bus control between the microprocessor control unit, the interface memory and the multi-line communications unit.

16. The apparatus of claim 15 further including a multiplexer means for controlling addressing of the interface memory from either the microprocessor control unit or the multi-line communications unit.

17. The apparatus of claim 14 further including a channel number register clocked from said CRI posting signal from said first control element for storing the communication line number and direction for the posted CRI.

18. The apparatus of claim 17 further including a comparator for comparing the channel number register line number with a requested line number from the multi-line communications unit to enable a CRI end only when there is a comparison detected.

19. The apparatus of claim 18 wherein said second logic circuit comprises a programmable array logic.

20. The apparatus of claim 18 further including an end CRI flip-flop responsive to said second logic circuit.

* * * * *